May 14, 1957 W. H. KLIPPEL 2,792,223
DEVICE FOR HANDLING AND FEEDING TABULATING CARDS
Filed Dec. 31, 1953 25 Sheets-Sheet 1

FIG. I

INVENTOR.
WARREN H. KLIPPEL
BY
ATTORNEY

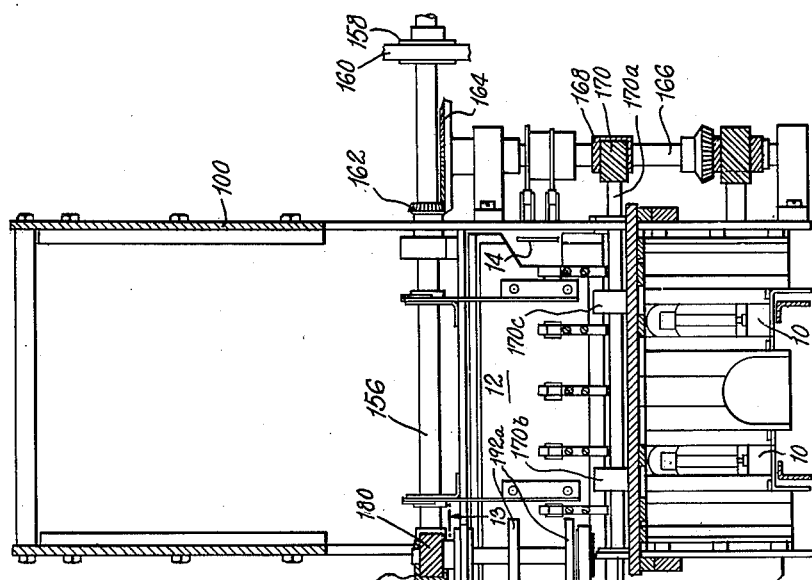

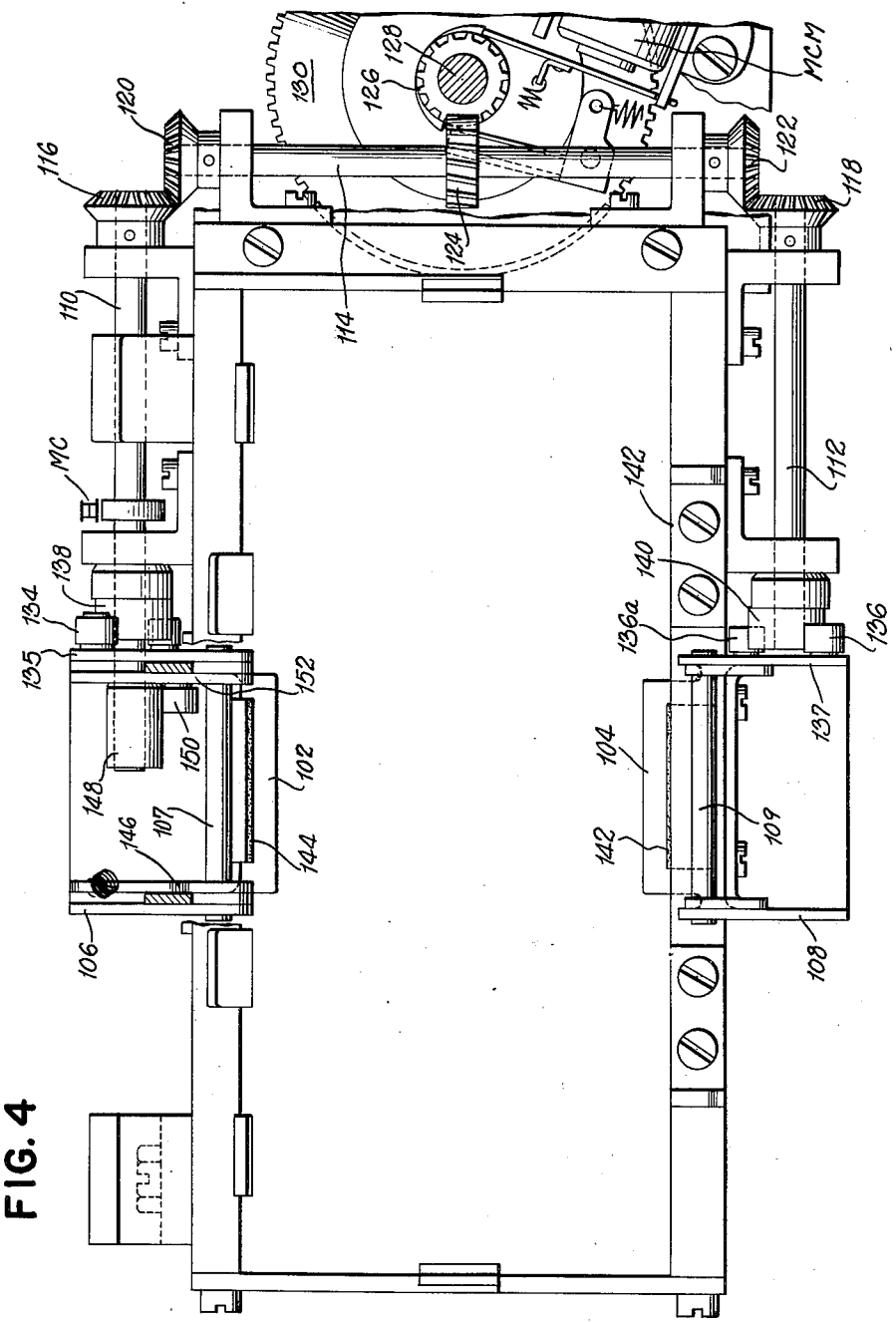

May 14, 1957 W. H. KLIPPEL 2,792,223
DEVICE FOR HANDLING AND FEEDING TABULATING CARDS
Filed Dec. 31, 1953 25 Sheets-Sheet 5

INVENTOR.
WARREN H. KLIPPEL
BY
ATTORNEY

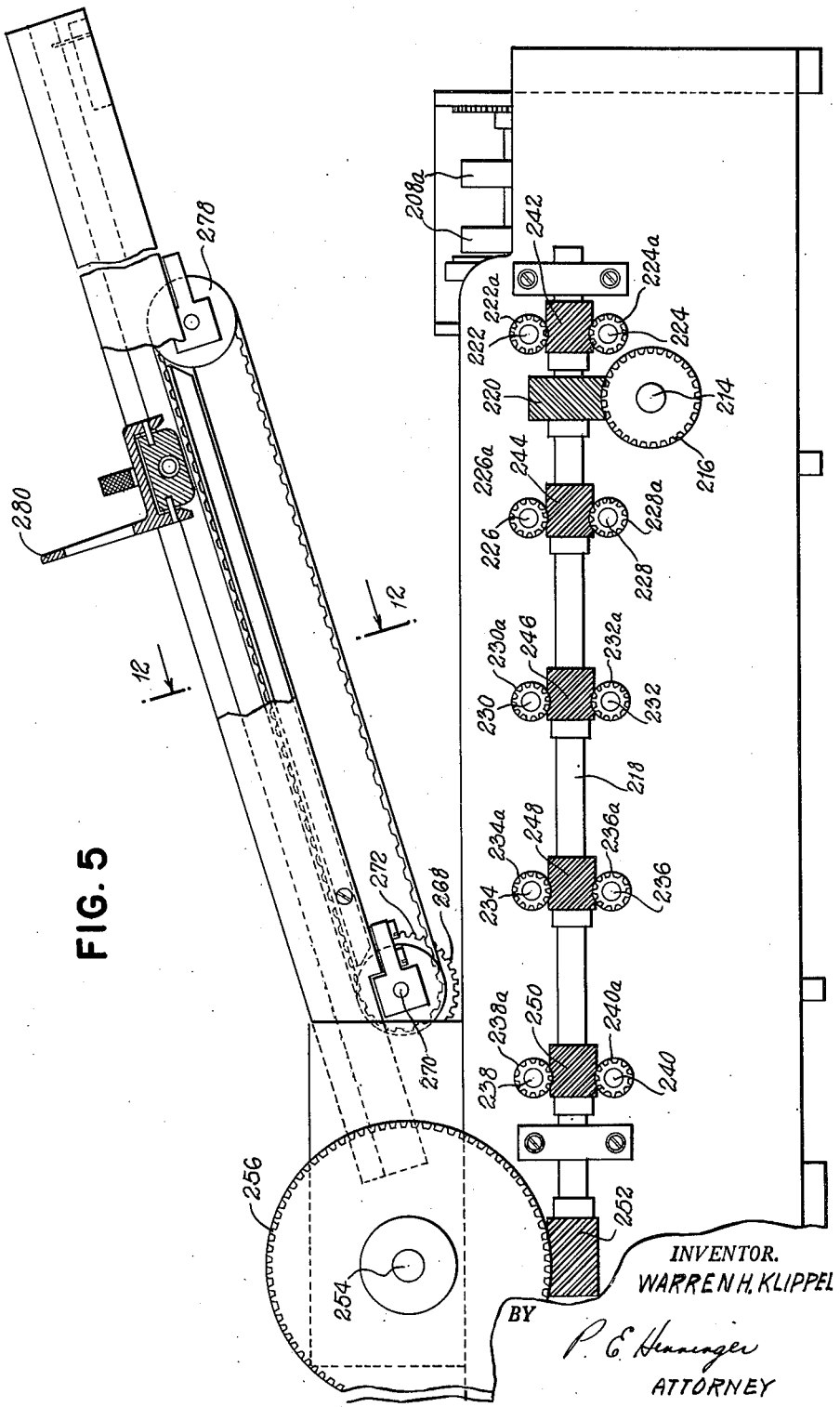

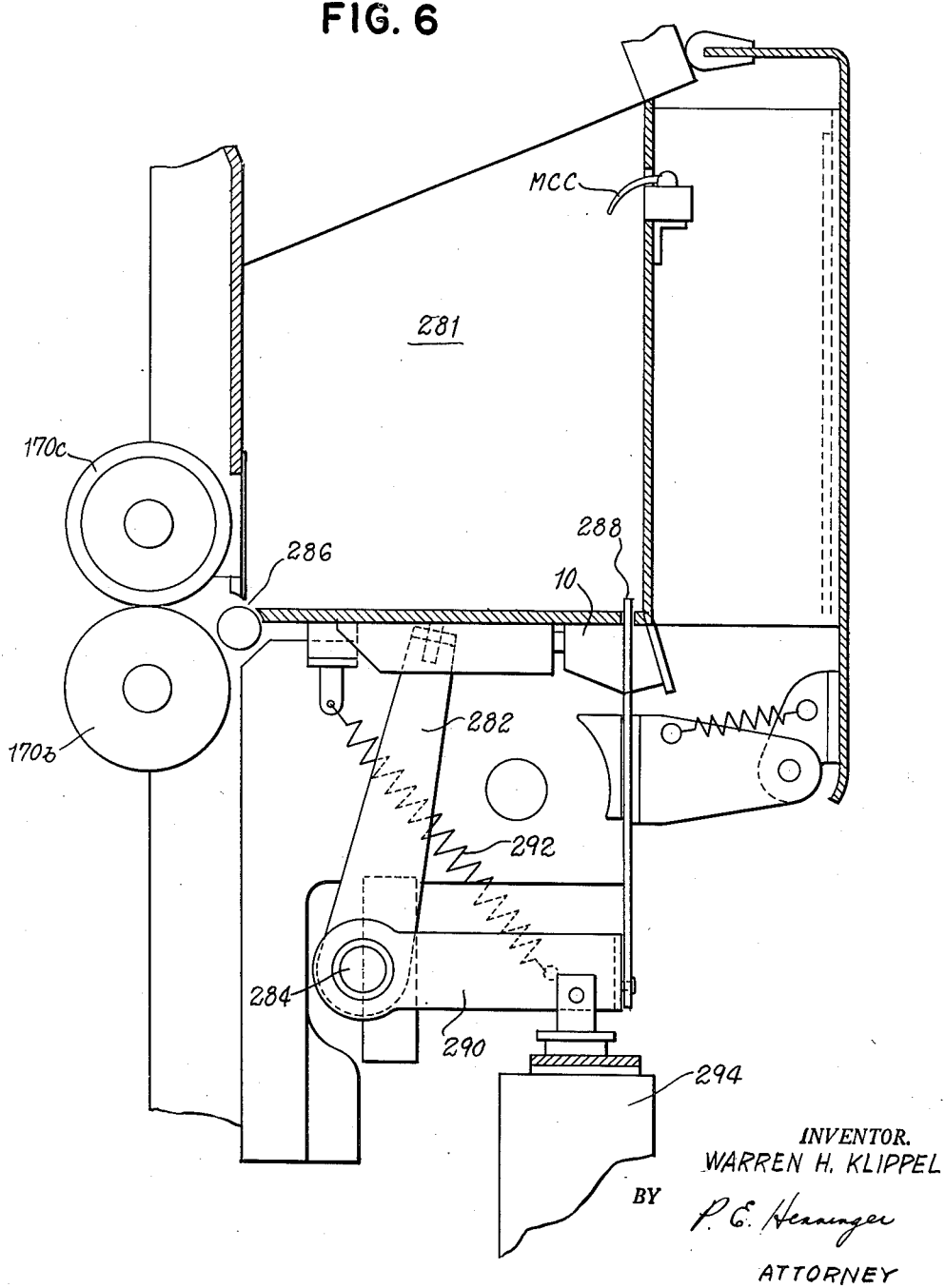

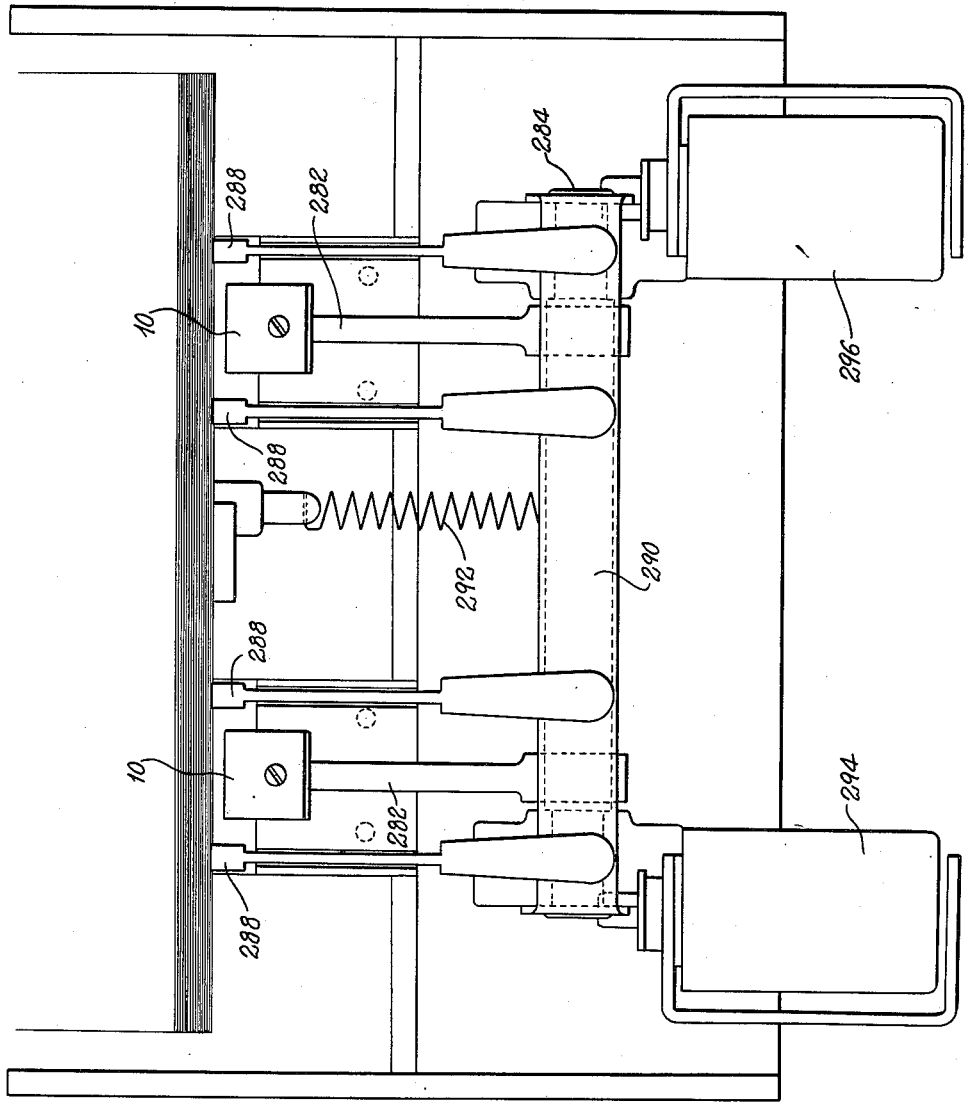

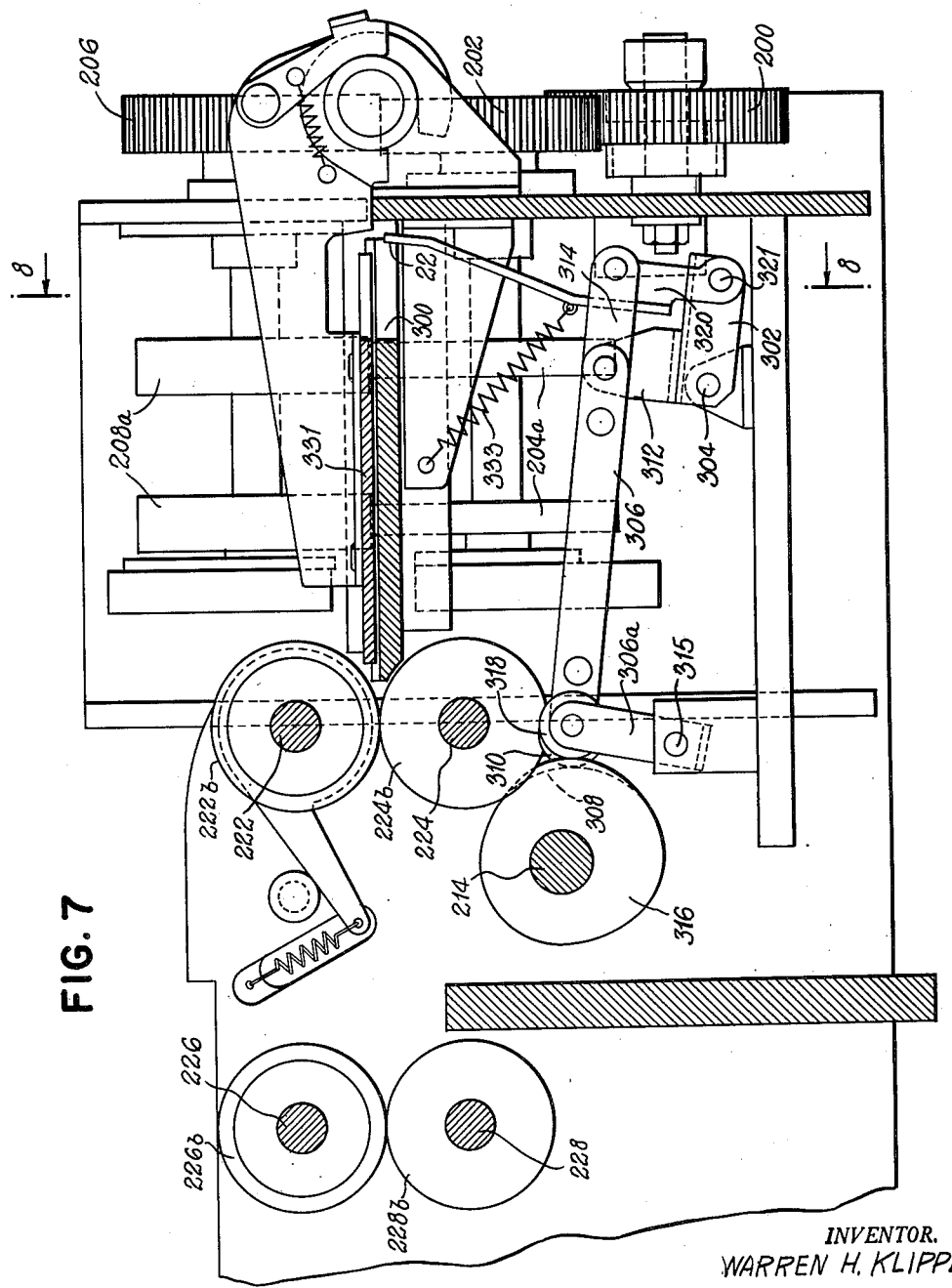

May 14, 1957 W. H. KLIPPEL 2,792,223
DEVICE FOR HANDLING AND FEEDING TABULATING CARDS
Filed Dec. 31, 1953 25 Sheets-Sheet 10

INVENTOR.
WARREN H. KLIPPEL
BY
ATTORNEY

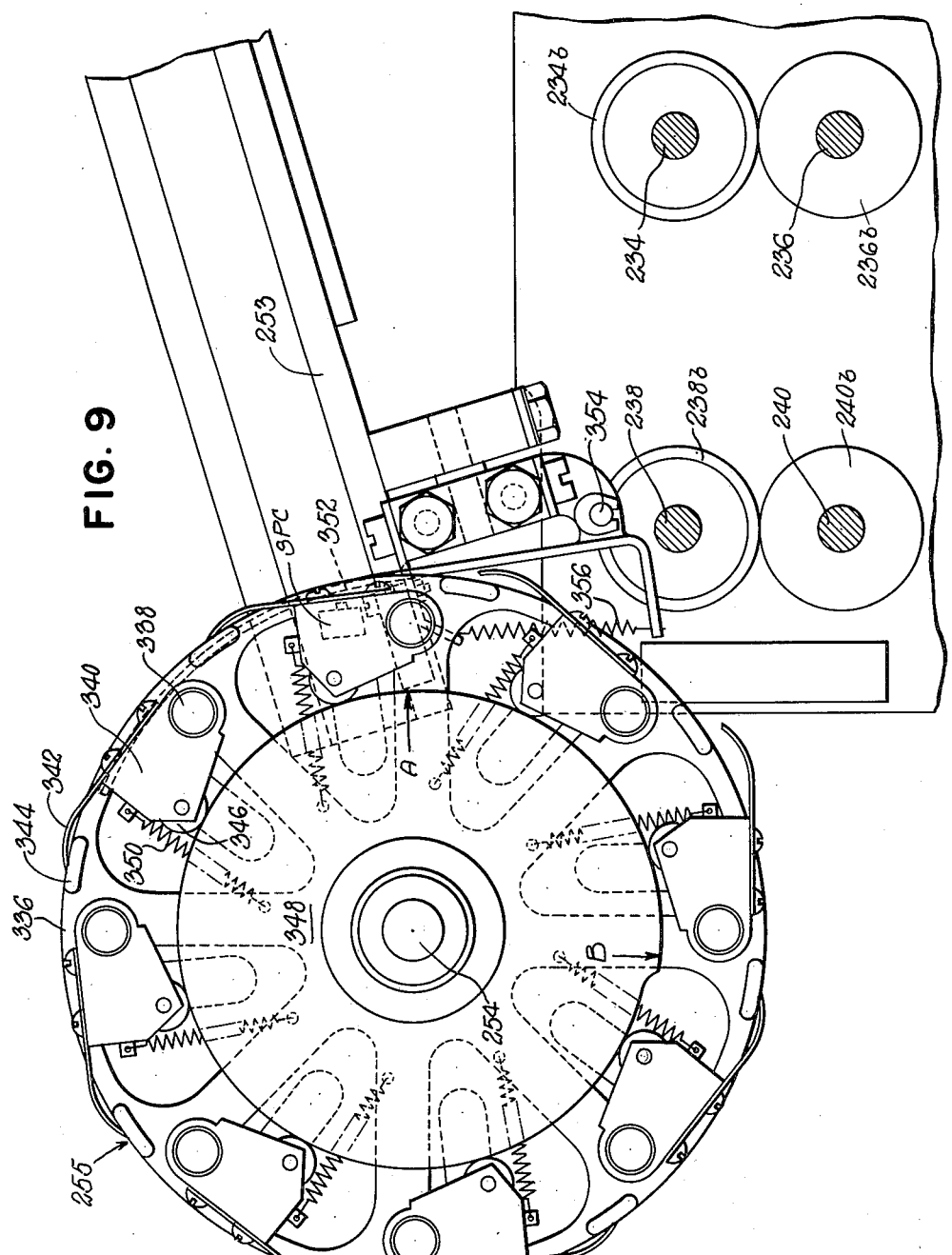
May 14, 1957 W. H. KLIPPEL 2,792,223
DEVICE FOR HANDLING AND FEEDING TABULATING CARDS
Filed Dec. 31, 1953 25 Sheets-Sheet 11
INVENTOR.
WARREN H. KLIPPEL
BY
ATTORNEY

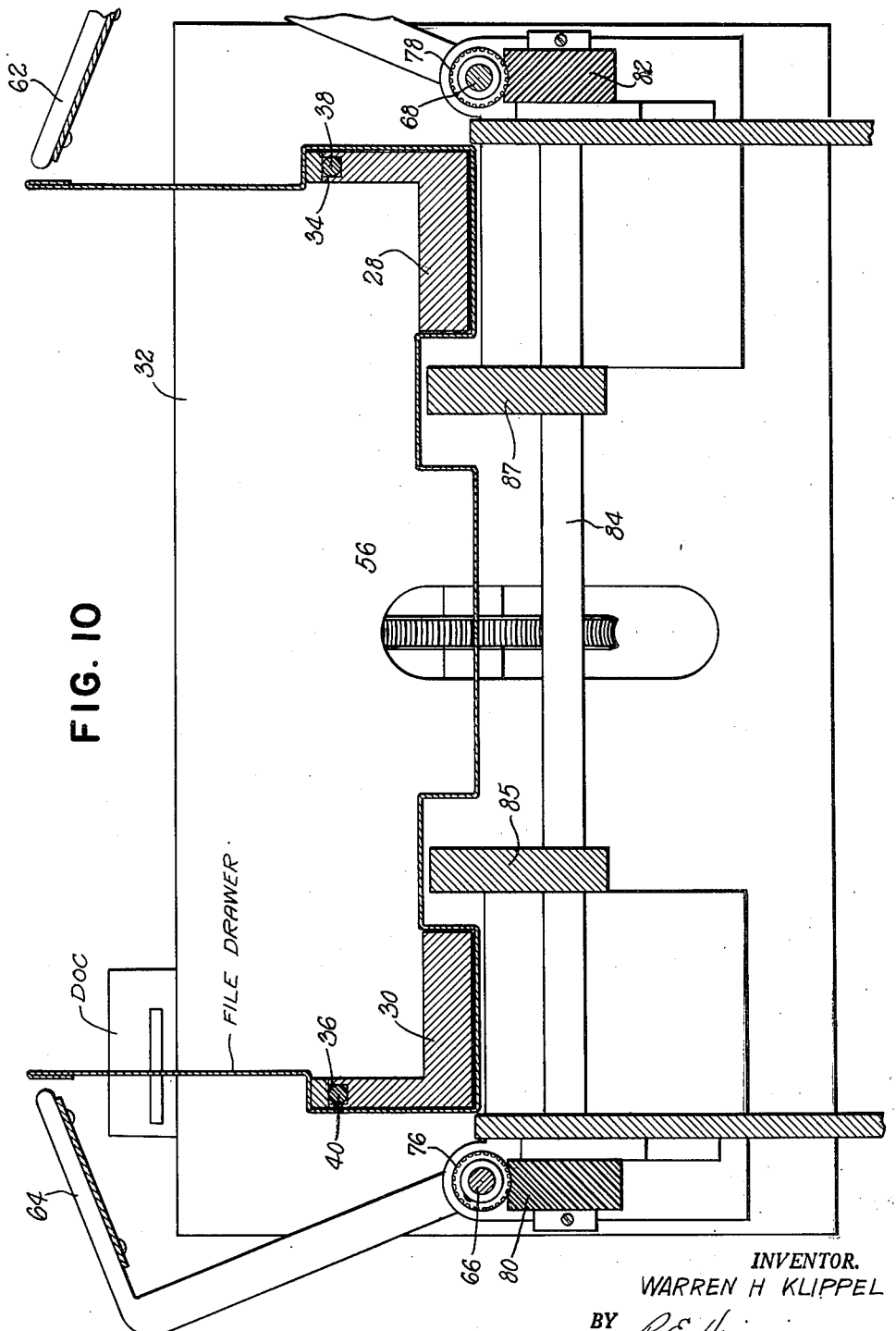

May 14, 1957 W. H. KLIPPEL 2,792,223
DEVICE FOR HANDLING AND FEEDING TABULATING CARDS
Filed Dec. 31, 1953 25 Sheets-Sheet 13

INVENTOR.
WARREN H. KLIPPEL
BY
ATTORNEY

May 14, 1957 W. H. KLIPPEL 2,792,223
DEVICE FOR HANDLING AND FEEDING TABULATING CARDS
Filed Dec. 31, 1953 25 Sheets-Sheet 14
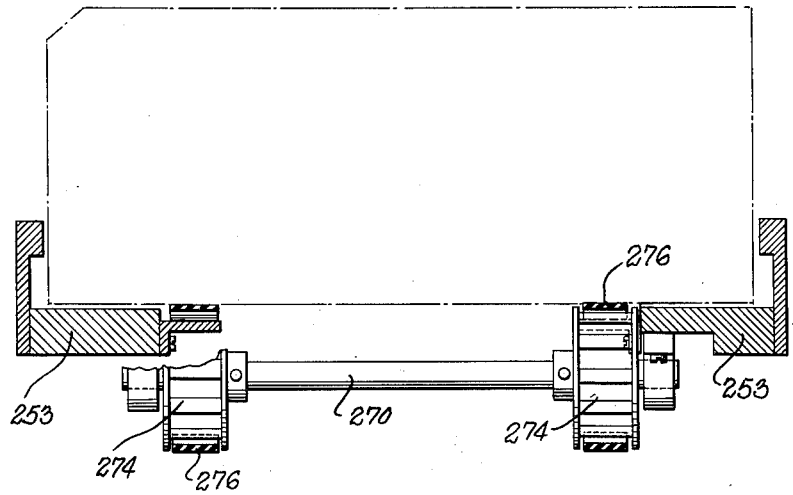
FIG. 12
FIG. 13
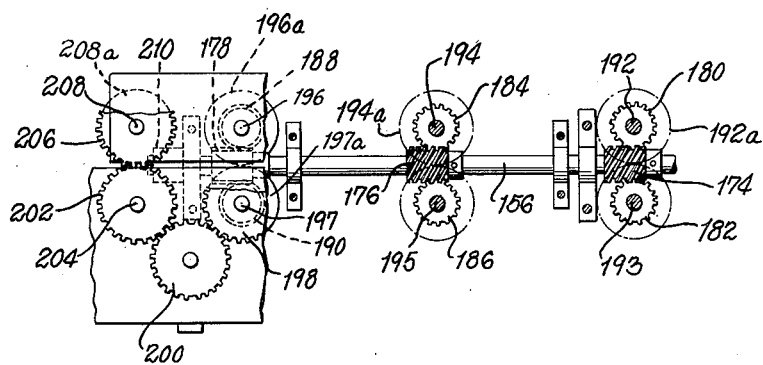
INVENTOR.
WARREN H. KLIPPEL
BY
ATTORNEY

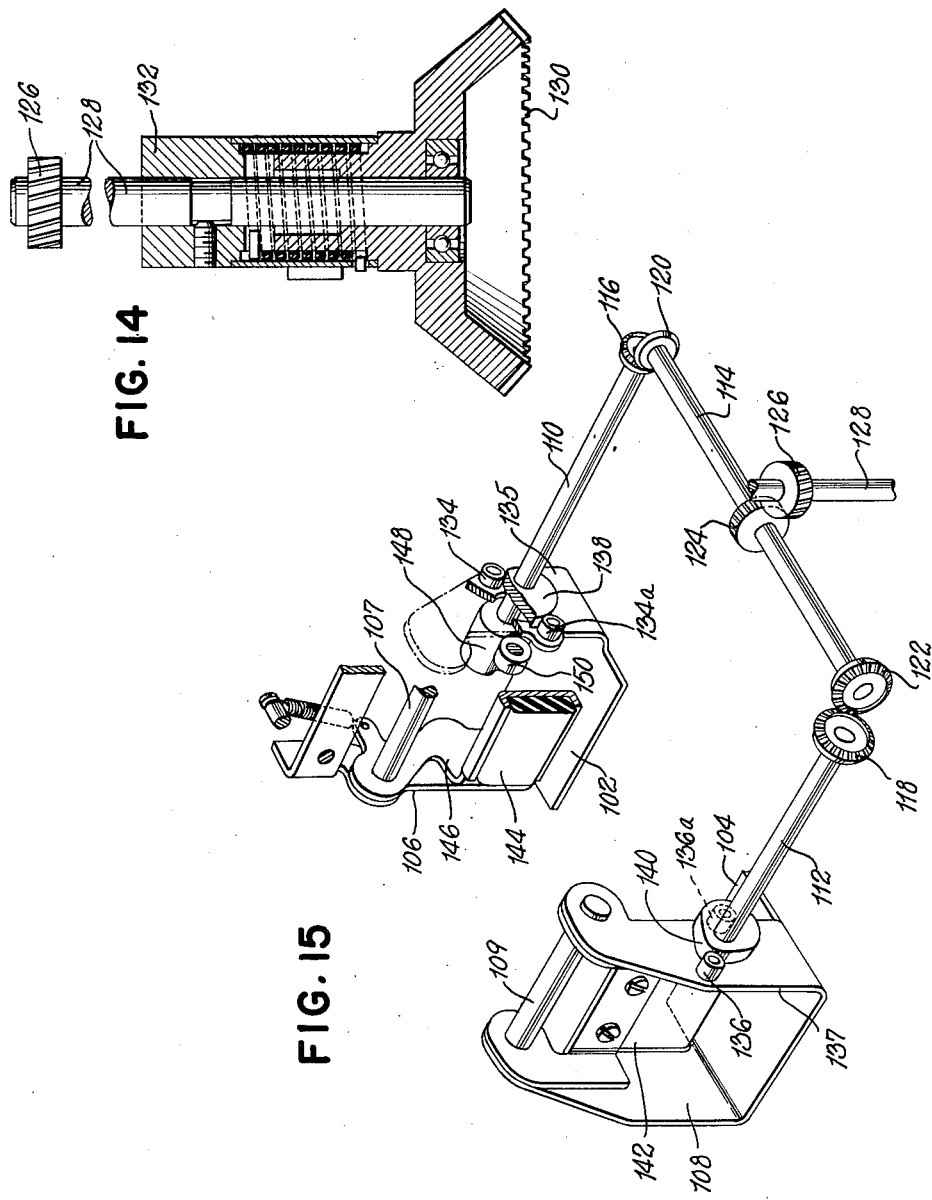

May 14, 1957 W. H. KLIPPEL 2,792,223
DEVICE FOR HANDLING AND FEEDING TABULATING CARDS
Filed Dec. 31, 1953 25 Sheets-Sheet 18

INVENTOR.
WARREN H. KLIPPEL
BY
ATTORNEY

May 14, 1957 W. H. KLIPPEL 2,792,223
DEVICE FOR HANDLING AND FEEDING TABULATING CARDS
Filed Dec. 31, 1953 25 Sheets-Sheet 19

INVENTOR.
WARREN H. KLIPPEL
BY
ATTORNEY

May 14, 1957   W. H. KLIPPEL   2,792,223
DEVICE FOR HANDLING AND FEEDING TABULATING CARDS
Filed Dec. 31, 1953   25 Sheets-Sheet 20

INVENTOR.
WARREN H. KLIPPEL
BY P. E. Henninger
ATTORNEY

May 14, 1957 W. H. KLIPPEL 2,792,223
DEVICE FOR HANDLING AND FEEDING TABULATING CARDS
Filed Dec. 31, 1953 25 Sheets-Sheet 21

INVENTOR.
WARREN H. KLIPPEL
BY
ATTORNEY

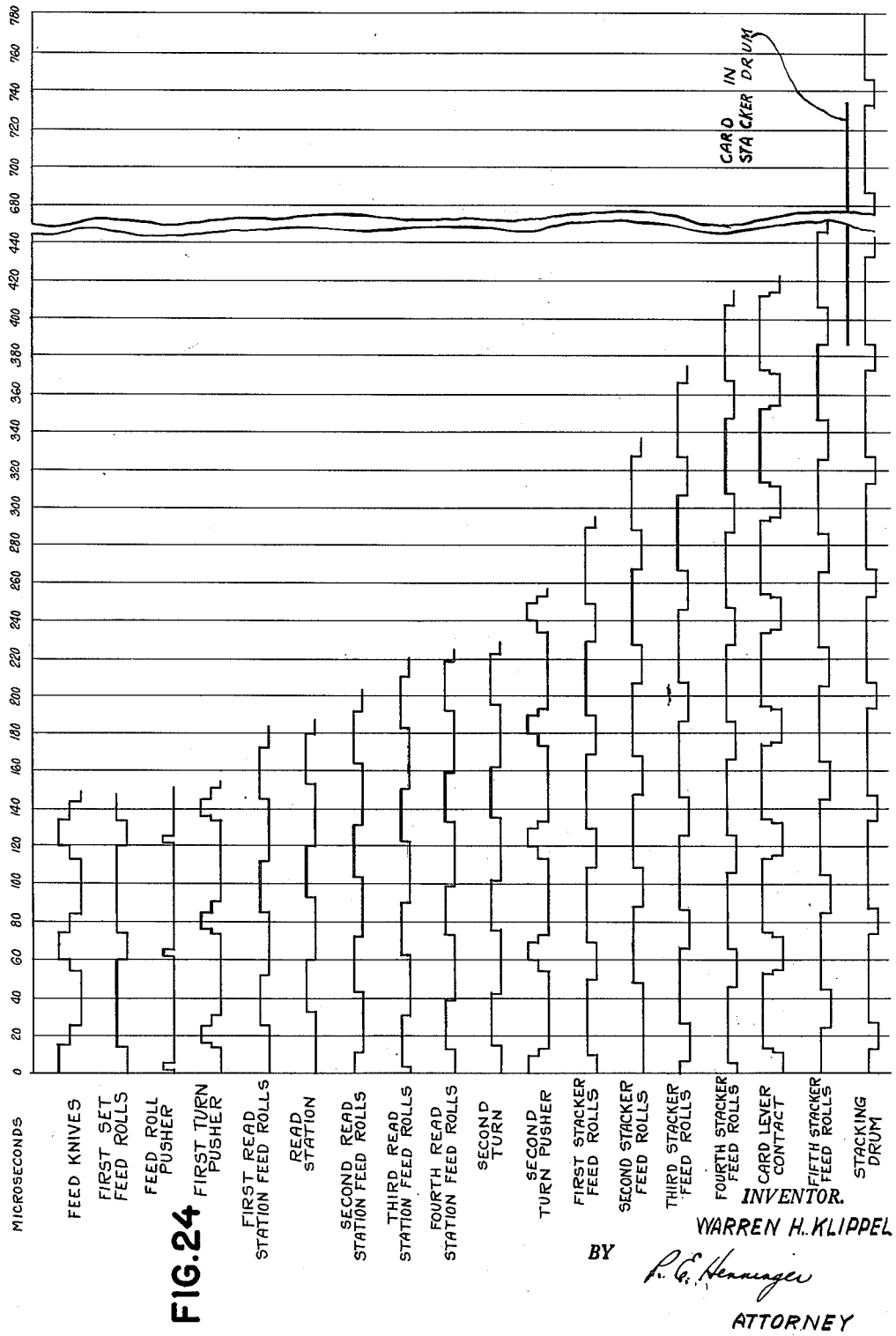

United States Patent Office 2,792,223
Patented May 14, 1957

2,792,223

DEVICE FOR HANDLING AND FEEDING TABULATING CARDS

Warren H. Klippel, Pawling, N. Y., assignor to International Business Machines Corporation, New York, N. Y., a corporation of New York Application December 31, 1953, Serial No. 401,597

14 Claims. (Cl. 271—61)

This invention relates to a high speed tabulating card feeding device.

More particularly, the invention relates to a device for feeding tabulating cards through a sensing station at a rate of 1,000 or more cards per minute.

A high speed card feed of the kind herein disclosed is a necessary adjunct to an electronic system for converting card recorded data and for reinscribing such data on a different medium, such as a magnetic tape, for example.

It is, therefore, an important object of the invention to provide a card input and take-off system for a high speed card feeding device that has high card capacity, and which will be otherwise compatible with the high card feed speed herein employed.

It is a specific object of the invention to provide a card feeding mechanism adapted to receive record cards directly from file drawers and, after the cards are sensed, to deposit such cards once more into the file drawer from which they were taken.

It is a further object of the invention to provide card metering and feeding mechanisms accommodated to the bulk handling of cards, and at high speed.

It is a further object of this invention to provide a high speed tabulating card feeding device having a card feeding magazine wherein a card feeding knife is located for feeding cards in seriatim from the bottom of a stack of cards in the magazine, together with means above and in alignment with said magazine for retaining a substantial number of cards, and means between the retaining means and the card magazine for intermittently metering limited numbers of cards into the magazine from the retaining means.

It is a further object of the invention to provide in a card feeding device, a card course comprising sections arranged in substantially perpendicular relation to each other and in which card feed rolls are provided for feeding cards to the end of one leg of the course and through the second leg in conjunction with a reciprocating member for engaging an edge of a card at the end of the first leg of the card course and for advancing the card into the feed rollers of the second leg of the course.

It is a specific object of the invention to provide a bed plate in a card feeding course in combination with card feeding rollers and in which the bed plate has a concave curvature corresponding to and in close proximity to part of the peripheral surface of the card feeding rollers for deflecting upwardly a card passing between the card feeding rollers and the curved bed plate section.

It is a still further object of the invention to form an upstanding abutment in the bed plate near the end of a card feeding course, which abutment faces a resilient buffer at the end of the card feeding course, and wherein the buffer is adapted to position cards against the abutment formed in the bed plate.

It is a further object of the invention to provide a loading rack for a tabulating card feeding device which comprises a plurality of rails adapted to support a card file drawer by engagement with complementary surfaces thereof and in which the rails are supported from a supporting plate in cantilever fashion, thereby permitting the insertion of a file drawer so that an entire file drawer of cards may be fed into the loading rack at a single operation. Furthermore, the invention contemplates a loading rack of the type described which is mounted for rocking movement between a generally horizontal loading position and a generally vertical card feeding position wherein the loading rack is in registration with a card feeding magazine.

It is a further object of the invention to provide a rotary card stacker for a high speed card feeding device wherein the rotary stacker delivers cards to a discharge rack which has means for intermittently moving accumulations of cards along the length of the rack and away from the zone at which the cards are deposited on the rack by the rotary stacker. In this regard the invention contemplates automatically operated means for accomplishing the purpose, all responsive to the pressure of cards that may accumulate at the discharge point of the rotary stacker.

It is a further object of the invention to provide a card feeding rack having large card capacity, which rack is disposable in alignment with a card feeding magazine and in which means are provided for intermittently feeding limited number of cards from the loading rack to a card feeding magazine.

It is a further object of the invention to provide card metering and feeding mechanisms accommodated to the bulk handling of cards, and at high speed.

Other objects of the invention will appear as the description thereof proceeds and when such description is read in the light of the drawings forming a part hereof.

In the drawings:

Fig. 3 is a plan view of the device, partly in section and partly in full line;

Fig. 3a is an enlarged view of a detent clutch mechanism used in connection with the card stacker assembly;

Fig. 4 is a plan view, partly in section, of a card metering hopper;

Fig. 5 is a side elevational view showing the drive mechanism of a card stacker assembly, parts being broken away to show underlying structure;

Fig. 6 is a sectional view through the card feed magazine;

Fig. 6a is a sectional view through the card feed magazine taken perpendicular to Fig. 6;

Fig. 7 is a sectional view on the line 7—7 of Fig. 3 and illustrates a card pushing mechanism;

Fig. 9 is a side elevational view (with parts in section) of a card stacking drum;

Fig. 10 is an enlarged cross-sectional view on line 10—10 of Fig. 2;

Fig. 12 is a sectional view on line 12—12 of Fig. 5, showing the details of the card take-off rack;

Fig. 13 is a view on line 13—13 of Fig. 3 and is designed to show the gear train of the card sensing section of the device;

Fig. 14 is an enlarged view somewhat in detail of a spring clutch used in the card metering system;

Fig. 15 is a perspective view of the card metering blades and an associated card stop buffer;

Fig. 17a is a plan view on a reduced scale of the tabulating card reading station taken at a plane somewhat higher than the perspective view of Fig. 17;

Fig. 17b is a reduced elevational view, more or less diagrammatic of the mechanism shown in Fig. 17a;

Figure 23A:
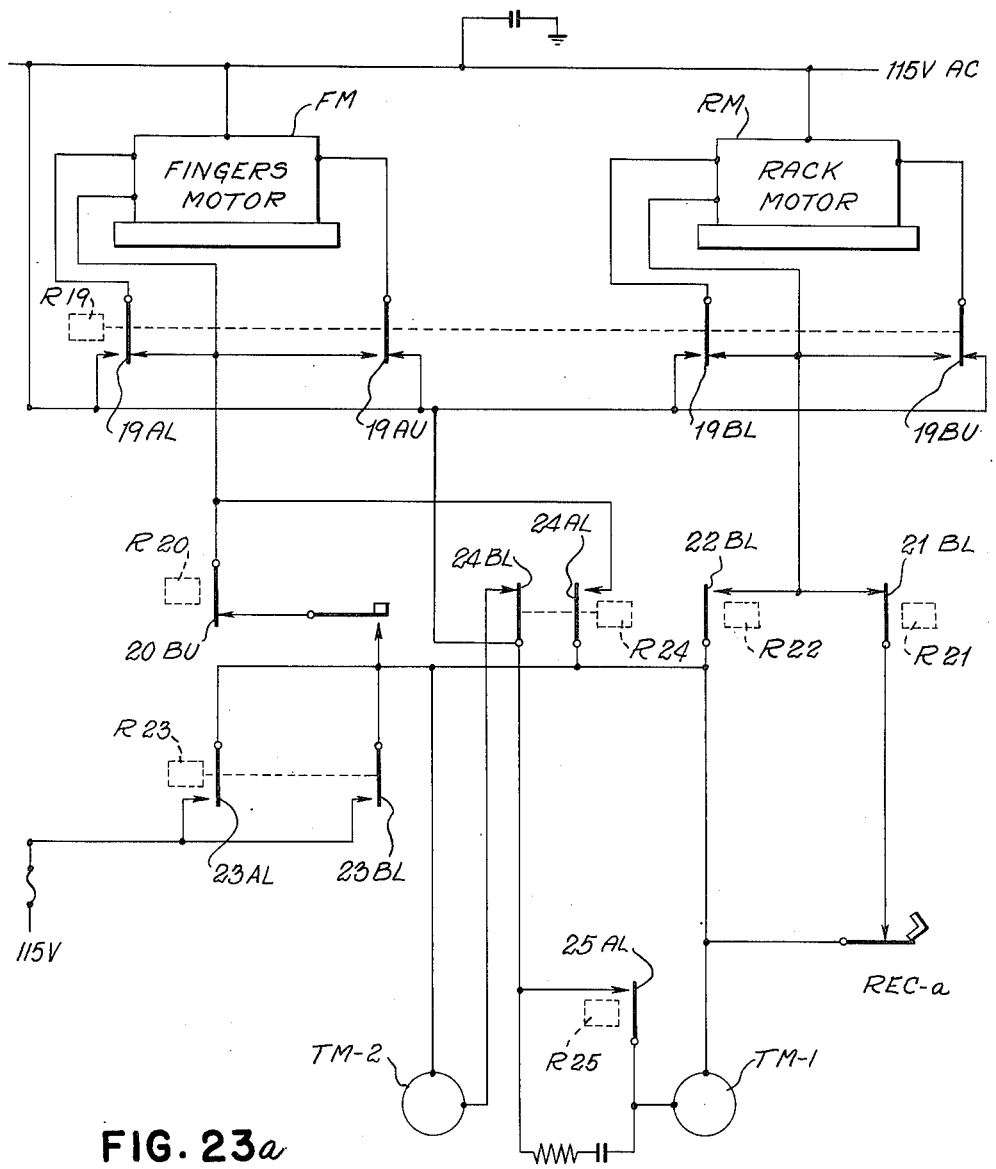
Figure 23B:
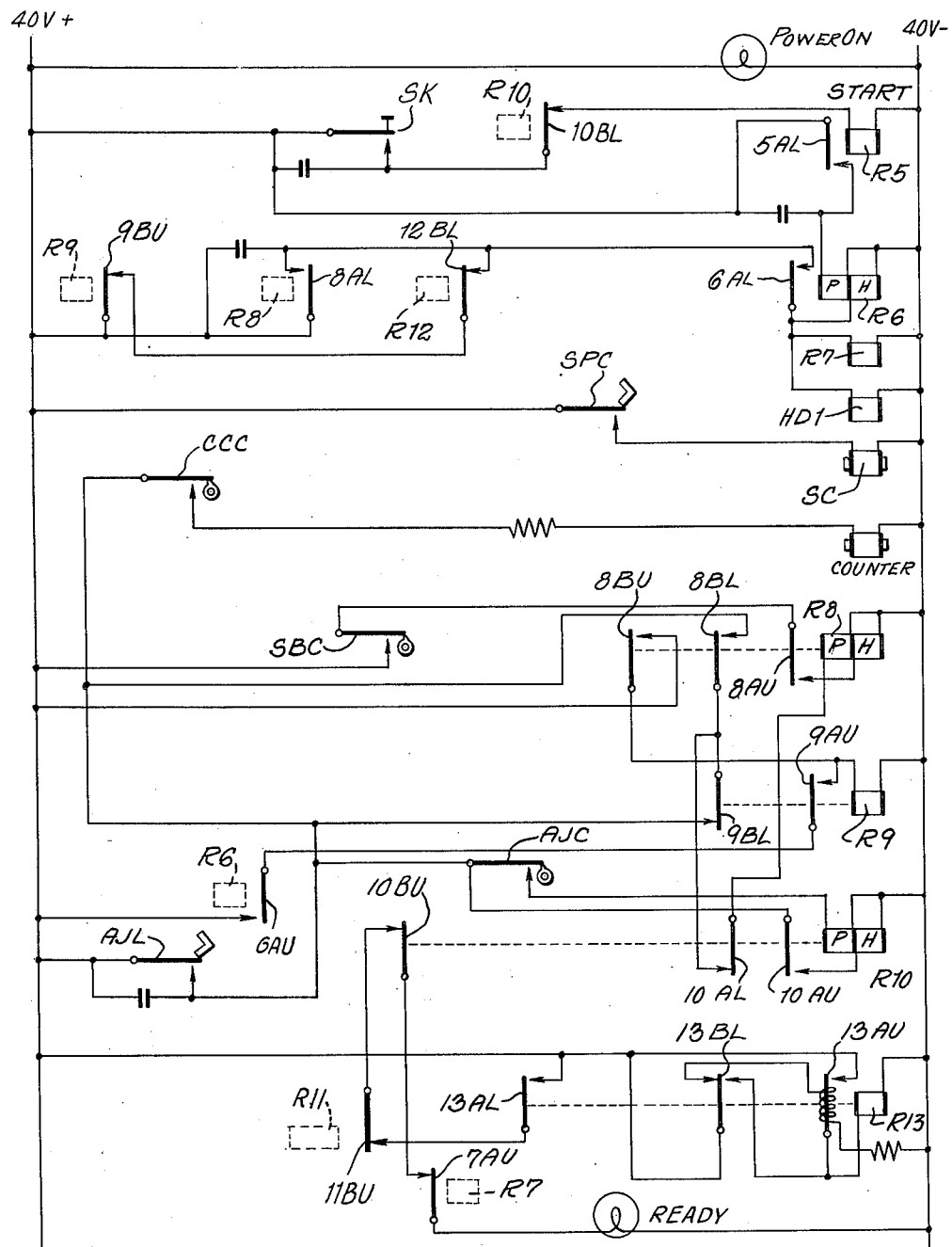
Figure 23C:
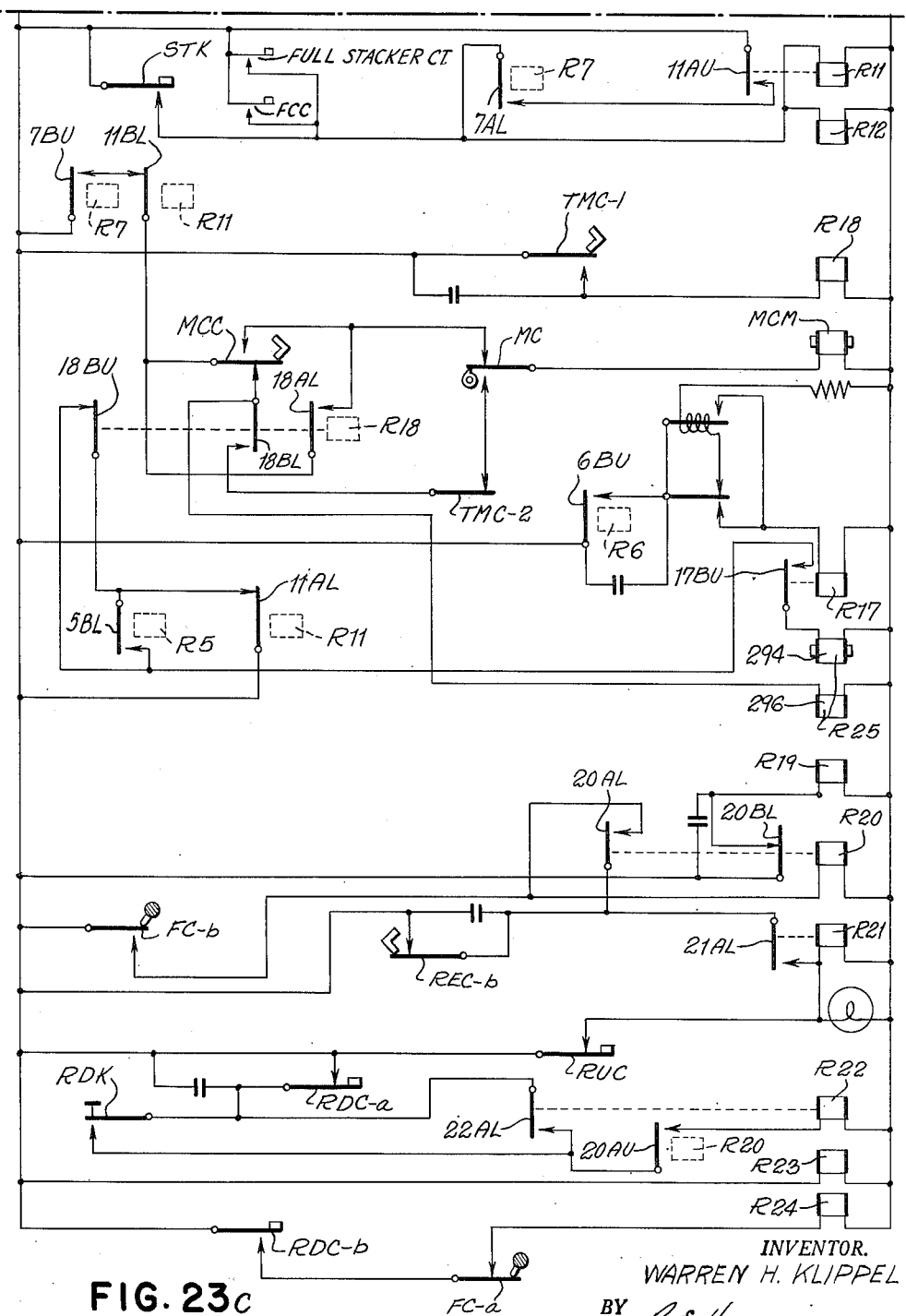

Figs. 23a, 23b and 23c taken together constitute the circuit diagram of the card feed device control system; and Fig. 24 is the timing chart showing the passage of a card through the feeding device in terms of microseconds.

With card feeds running at high speed, it becomes necessary to have a faster method of placing cards in the machine than by the hand method now employed. Since 500 cards is the maximum number of cards that an operator can easily manipulate by hand, it can be seen that a machine running at 1,000 cards per minute would require the operator to put two handfuls of cards into the machine and to remove two handfuls of cards from the stacker each minute. This allows only fifteen seconds for each operation which, on a continuously running machine, is impractical.

It is logical, therefore, to put the cards into the machine by the medium by which they are stored and transported. The machine must be capable then of receiving cards both from the card file drawers and by hand. Having card file input in the machine introduces a problem which occurs whenever there is a large capacity of cards in the feed hopper, and where large capacities are being added while the cards are being fed. The conventional feed knives of a card feeding device will feed cards from a stack of approximately 1000 cards. This capacity can be increased if the feed hopper is inclined at an angle so that the whole weight of cards is not on the feed knives themselves. This angle need not be on the overall hopper, but can be at any convenient place in the length of the hopper, as graphically shown in Fig. 21.

Figure 21:
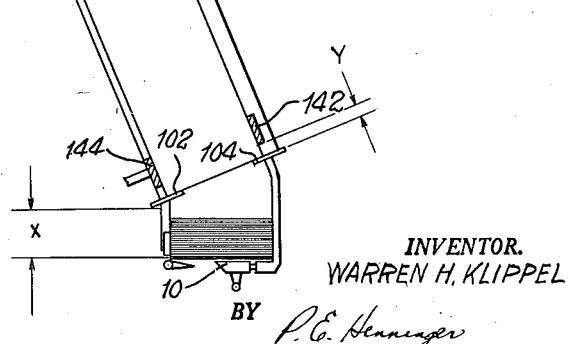
Fig. 21 is a diagrammatic view showing the relationship between the card feeding rack, the metering hopper and the card feeding hopper.

This latter method is advantageous since the feed knives can then work in the plane which lends itself best to the rest of the machine design. Care must be taken, however, so that the distance X in Fig. 21 is not so great that the cards will not feed due to excess weight.

Figure 4A:
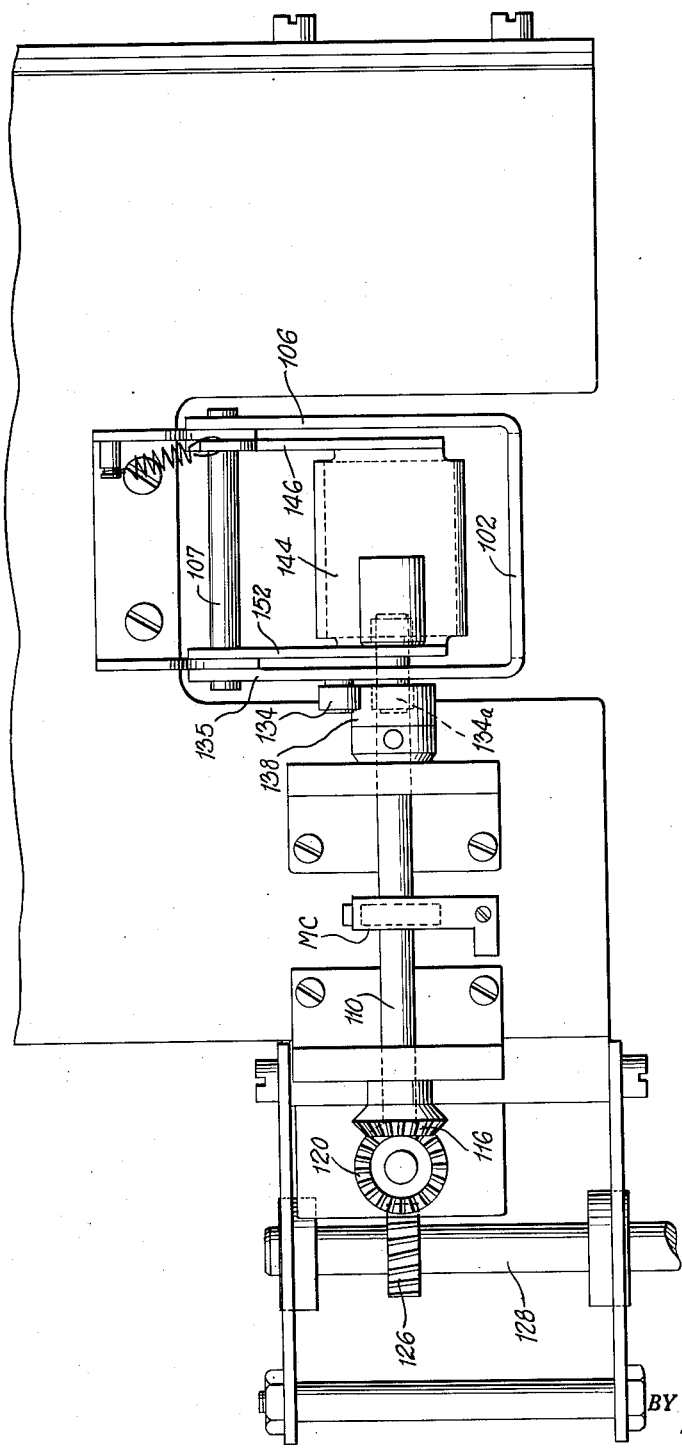
Fig. 4a is an enlarged perspective view of a card metering blade and an associated card stop buffer located in the metering hopper.
Figure 19:
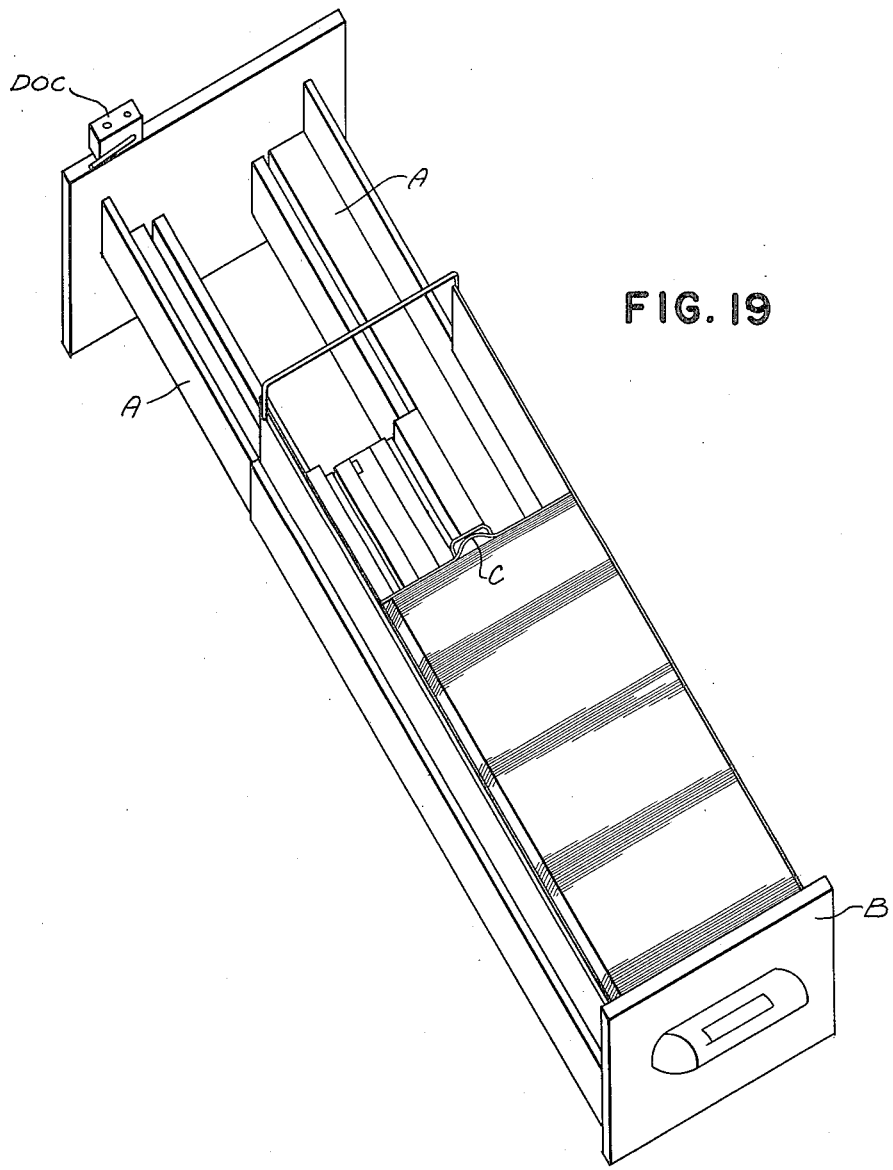
Fig. 19 is a perspective view showing the interrelation of the card feed rack and a card file drawer.
Figure 20:
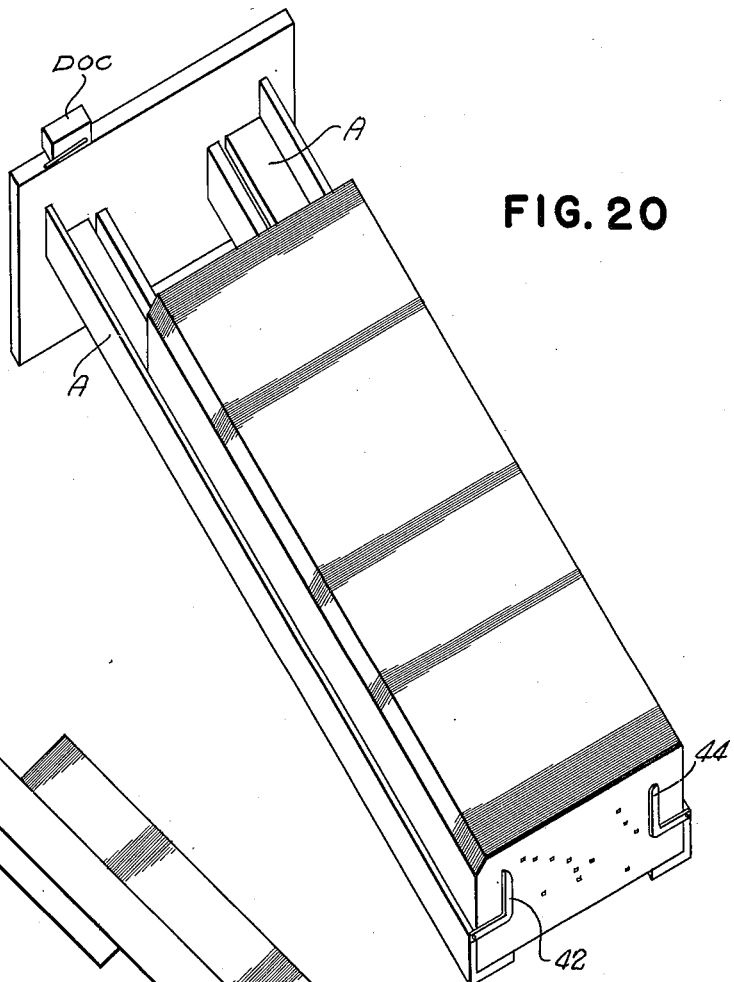
Fig. 20 is a perspective view similar to that of Fig. 19 but shows the relation of the card feed rack and a load of tabulating cards thereon after the file drawer has been removed.

One method of card file drawer input is graphically shown in Fig. 19. The rails A fit inside the drawer B, the file card slide C is removed from the end of the drawer and the drawer is positioned all the way up on the rails. When the drawer reaches its furthest position, it actuates a microswitch DOC which turns on the fingers motor FM and the fingers 42 and 44 (Fig. 20) rotate through ninety degrees. The drawer is then removed from the rail. The fingers 42 and 44 hold the cards on the rails and the cards slide out of the drawer, as shown in Fig. 20. The rails A are then rotated about shaft 84 (Fig. 2) to line up with the metering feed hopper. The hopper is in line with the metering feed hopper, and the fingers 42 and 44 are rotated through ninety degrees, leaving the cards on the rack rails free to drop to the stop blades 102 and 104 (Fig. 4). The stop blades absorb the full shock of the cards. When more cards are needed in the immediate feed hopper, a rubber plunger 144 closes on the card column, compressing the cards between a stationary rubber feed stop buffer 142 and itself. The blades 102 and 104 are then moved out of the path of the cards and the cards in the space Y, Fig. 21, are free to drop into the immediate feed hopper. The blades 102 and 104 are then brought back into the path of the cards and the rubber plunger 144 is withdrawn, allowing the column of cards to drop back down onto the blades again. This process is repeated until all cards have been dropped as needed into the immediate feed hopper. When the column of cards is clear of the rack empty contacts REC–a and REC–b (Fig. 2) on the intermediate or metering feed hopper, the card rack can then again be rotated into its loading position to receive another drawer of cards.

The cards are fed out of the magazine by conventional picker knives 10 (Fig. 6), into a corner station 12, where they are fed endwise by a pusher blade 14 into a series of feed rollers, the first of which are indicated by the reference numeral 192a, and thence through a sensing station 18. The cards are now fed into a corner station 20 over a so-called "ski-jump" which involves a surface of the card bed concentric with the upper feed rolls for an appreciate distance, thus forming an abutment beyond the feed rollers against which the cards are forced by a resilient stop. This structure is graphically illustrated in Fig. 22. The card is then fed perpendicular to its previous course by means of pusher blades 22. The pusher blades 22 push the cards forward into a series of feed rollers, the first set of which is 222b, and into a conventional stacker drum 26. Mounted in front of the stacker drum is a pressure contact which causes a tractor to operate when the pressure against the drum exceeds a certain point. This tractor then pulls the cards up along the stacker rails until the pressure is relieved from the stacker. The tractor is controlled by a clutch impulsed by a contact operated by the pressure lever.

A stacking or off-take rack is similar in construction to the feed rack, and it is adapted to receive an empty card file drawer in the same manner.

Since it would be advantageous in some instances to put the same cards back into the drawer from which they were taken, it becomes necessary to mark the last card in the drawer to distinguish it from all other cards. This can be done by using a different corner cut or a colored card. The operator in such case merely reaches down the stacker rack to the last card for a drawer and slides the cards into position through the rear of the drawer, placing the file drawer slide in the drawer, clamping the cards and removing the drawer from the stacking tray.

Figure 2:
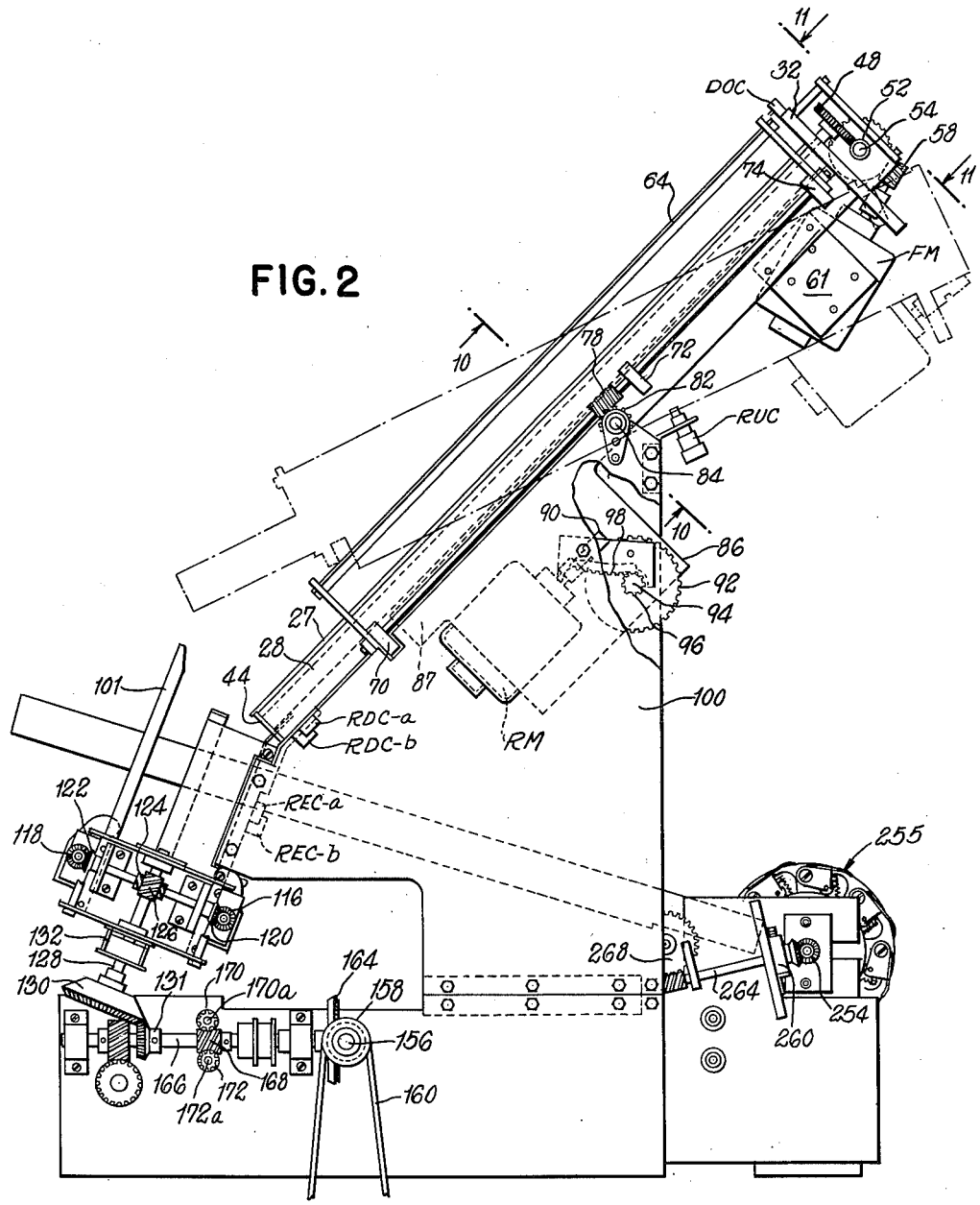
Fig. 2 is an end elevational view showing a card feeding rack and associated mechanisms, the rack being in its card feeding position and the dotted lines indicating the charging position of the rack.

The card feed rack consists of a pair of drawer supporting rails 28 and 30 which are supported in cantilever fashion from an end plate 32 (Fig. 2). The supporting rails 28 and 30 are angular in shape and are adapted to conform to a complementary surface in the file drawer.

Each of the drawer supporting rails 28 and 30 has a longitudinal recess 34 and 36 (Fig. 10) in the upper edge of the angle, and in each of these recesses is disposed a finger operating rod 38 and 40, respectively. At the free end of the finger operating rods 38 and 40 are card retaining fingers 42 and 44 respectively (Fig. 20). The fingers 42 and 44 are substantially of angular shape, and of such width as to lie within the plane of the angular rack rails when in their retracted position.

Figure 11A:
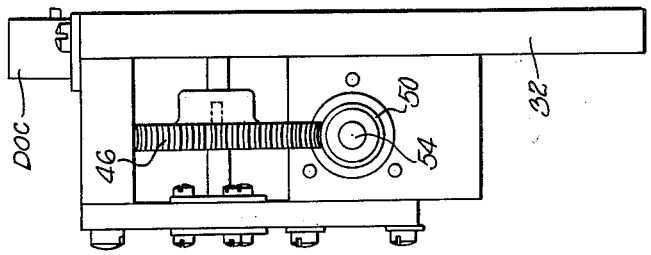
Fig. 11a is a side elevational view showing the mechanism of Fig. 11.
Figure 11:
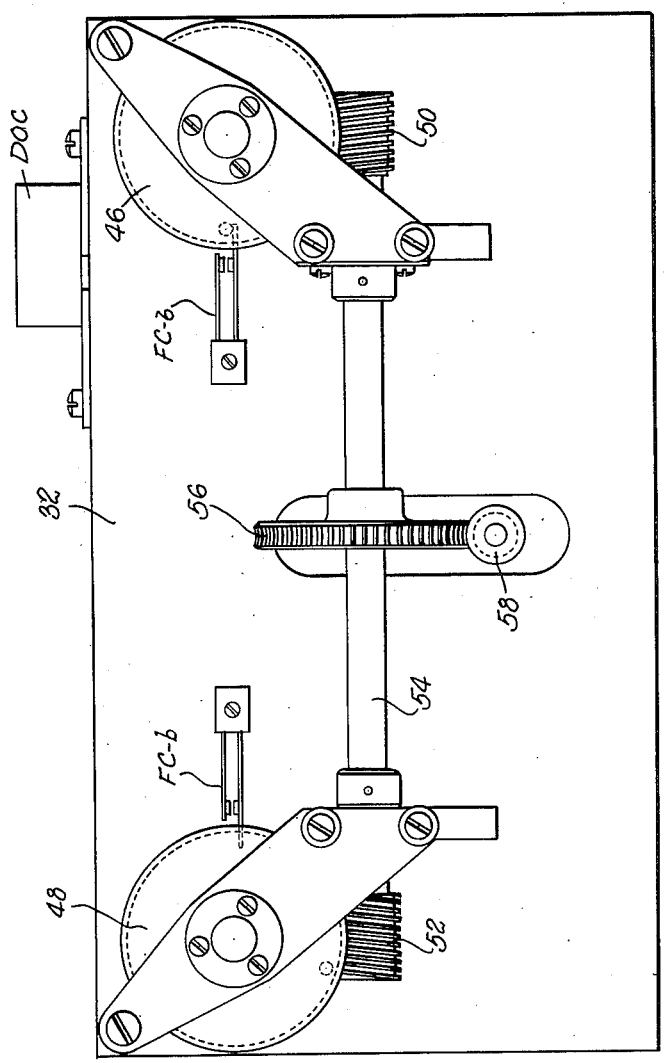
Fig. 11 is a view on line 11—11 of Fig. 2.

At the opposite ends of the finger operating rods 38 and 40 are a pair of gears 46 and 48, respectively (Fig. 11). The gears 46 and 48 are in contact with worm gears 50 and 52 respectively, which are mounted on a shaft 54. The shaft 54 has fixed thereto a drive gear 56 which is in operating contact with a motor driven worm gear 58. The worm gear 58 is fixed to the end of the drive shaft of a motor FM, the latter being attached to a bracket 61 carried by the card feed rack (Fig. 2).

It is evident therefore that whenever the motor FM is energized it will impart motion to its worm gear 58, the drive gear 56, the worm gears 50 and 52 and to the finger operating rods 38 and 40 by way of the gears 46 and 48 which are fixed to the end of the finger operating rods 38 and 40, respectively. As a consequence of this motion, the fingers 42 and 44 may be projected into the position shown in Fig. 20, and then retracted to the position in which they do not obstruct card feed. The fingers 42 and 44 will engage behind a tray of cards and hold the cards on the card feed rack while the tray itself is withdrawn. It is contemplated that the fingers 38 and 40 will be retained in their card holding position as shown in Fig. 20 until the card feed rack is rotated into registration with the card metering feed throat. When the card feed rack is rotated into the feed position which is the generally upright position shown in Fig. 2, the fingers 42 and 44 will be withdrawn to permit the cards to feed from the card feed rack in a manner to be described in greater particularly hereinafter.

In order to retain the cards in the card feed rack and prevent them from falling forwardly therefrom when the rack is in its generally upright position, there has been provided a pair of card covers 62 and 64 which are adapted to overlie the upper edge of the cards in the rack when the card feed rack is in operative card feeding position. The card covers 62 and 64 are mounted on card cover mounting shafts 66 and 68 respectively. These shafts, shafts 68 for example, pass through a plurality of brackets 70, 72 and 74 which extend from the side of the card feed racks. To the card cover mounting shafts 66 and 68 are fixed a pair of worm gears 76 and 78 respectively. The worm gears 76 and 78 are in contact with a pair of beveled gears 80 and 82 respectively which are fixed to the ends of a shaft 84. The shaft 84 is fixed against rotation and constitutes the point about which the card feed rack is adapted to rock.

Forming a part of the card feed rack, and being supported likewise in cantilever fashion from the end plate 32 of the card feed rack, are a pair of rack supporting rails 85 and 87. The rails 85 and 87 form bearing points on which the rack may pivot on the shaft 84. Fixed to the rack supporting rails 85 and 87 is a housing for a rack motor RM. The rack motor RM has fixed to its drive shaft a worm gear 90 (Fig. 2). The worm gear 90 in turn is in driving engagement with a gear 92 and the gear 92 drives a shaft 94, the shaft 94 being mounted for rotation in the motor housing. The shaft 94 has attached thereto at one end a pinion 96 which is in driving engagement with a toothed rack 98, the latter being fixed to the frame 100. The rack 98 is slightly arcuate in shape so that when the motor RM, through its worm gear 90, drives the gear 92 and the shaft 94, the pinion 96 will move along the length of the somewhat arcuate toothed rack 98, thereby controlling the rocking movement of the card feed rack about its pivot rod 84. It will be seen, therefore, that whenever the motor RM is energized, the card feed rack will be tilted about its pivot rod 84 in one direction or another, depending upon the direction in which the motor RM is driven.

The card feed rack is adapted to discharge cards into an intermediate card metering feed which constitutes a short, fixed continuation of the card feed rack when the latter is in card feeding position. The card metering feed is characterized by the provision of a pair of card supporting blades. These blades are shown in Figs. 4 and 15 by the reference numerals 102 and 104. One of the blades is located at the back of the metering feed throat and the other is located at the front of the metering feed throat in such inwardly projecting position that the fingers 102 and 104 are adapted to support the cards feeding from above and will so support the card column until the blades are withdrawn for the purpose of dropping a predetermined number of cards into the card feed magazine.

The card supporting blades 102 and 104 constitute integral parts of brackets 106 and 108, respectively. These brackets are mounted for rocking movement on shafts 107 and 109, respectively. The finger brackets 106 and 108 and consequently the card supporting fingers 102 and 104 are adapted for periodic rocking movement about their supporting shafts 107 and 109 respectively, by means of power operated shafts 110 and 112, respectively. The operating shafts 110 and 112 are supported for rotary movement in a pair of brackets respectively at each side of the metering feed, and both of these shafts are adapted to be driven by means of a countershaft 114.

More specifically, by reference to Fig. 4, it will be noted that the blade operating shaft 110 has attached to the end thereof a miter gear 116, while the shaft 112 has attached to one end thereof the miter gear 118. The miter gears 116 and 118 are in driving contact with similar miter gears 120 and 122, respectively, which are carried by the countershaft 114. Also fixed to the countershaft 114 is a helical gear 124 which is in driving contact with a helical gear 126 (Fig. 2). The helical gear 126 is fixed to a drive shaft 128 to one end of which is attached a gear 130 which is in constant driving connection with a gear 131 constituting part of the general drive system of the device.

Whenever the drive gear 126 is rotated, the drive shafts 110 and 112 will be similarly rotated to impart rocking movement to the brackets 106 and 108 respectively in a manner to be described in greater detail hereinafter.

Driving power from the gear 131 and through the gear 130 and shaft 128 is transmitted by way of a clutch 132 which is shown in greater detail in Fig. 14. Whenever the clutch 132 is energized, a driving connection will be established between the gear 130 and the gear 126 (Fig. 2) to impart driving motion to the blade bracket drive shafts 110 and 112, respectively.

By further reference to Figs. 4 and 15, it will be seen that associated with each of the brackets 106 and 108 are a pair of cam followers 134—134a and 136—136a, respectively. The cam followers 134 and 134a are mounted on a side flange 135 of the bracket 106, whereas the cam followers 136 and 136a are mounted on a side flange 137 of the bracket 108.

The ends of the drive shafts 110 and 112 in proximity to the brackets 106 and 108, respectively, have affixed thereto cams 138 and 140 respectively. These cams are so formed and proportioned that they are in constant contact with their associated cam followers 134—134a and 136—136a, whereby any movement of the cams 138 and 140 will impart a movement to the brackets 106 and 108.

It will be seen, therefore, that whenever the shafts 110 and 112 are rotated the brackets 106 and 108, respectively, will be rocked about their supporting rods 107 and 109 respectively. This rocking movement is periodically imparted to the brackets 106 and 108 to withdraw the card supporting blades 102 and 104 from beneath the cards resting thereon and thereby drop a measured bulk of cards onto the card feeding knives in the card feeding magazine, as to be described more in detail hereinafter.

Mounted within the metering throat at a predetermined distance above the card supporting blades 102 and 104 are a pair of stops by means of which a column of cards may be held within the metering throat. The card stop devices consist of a pair of soft rubber bumper mounts between which the cards may be compressed to prevent their further downward movement through the metering throat. Two such stops are provided. At the front of the metering throat is a fixed rubber card stop member 142 which is not substantially beyond the plane of the inner wall of the metering throat, and therefore does not interfere with the movement of cards fed through the throat. At the rear of the metering throat is a movable rubber stop member 144 which is mounted in a movable rubber stop bracket 146. The bracket 146 is mounted for rocking movement on the shaft 107 so that the same may be projected forwardly into the feed throat and thereby compress a card column between its inner face and the opposite fixed rubber stop member 142, thereby preventing further downward feed of cards until the movable rubber card stop 144 is retracted.

The bracket 146 in which the movable card stop member 144 is mounted is adapted to be rocked at given times to project the face of the movable rubber stop member 144 inwardly. This is accomplished by means of a cam 148 which is mounted on the inner end of the shaft 110 (Figs. 4 and 15). The cam 148 is in contact with the cam follower 150 which is mounted on a side bracket 152 of the card stop member bracket 146. Thus, whenever the cam 148 is rotated, it will serve to project the bracket 144 inwardly into such position that the rubber card stop member on its face will grip cards and prevent their further downward movement.

It will be evident that the flange 135 of the card blade supporting bracket 106 is suitably apertured at the point where the shaft 110 passes therethrough so that relative movement is permitted between the brackets 106 and 146. It will be remembered that the blades 102 and 104 are withdrawn for the purpose of dropping cards downwardly onto the feed knives in the feed magazine. It is at this moment that the rubber card stop member 144 must be projected inwardly. Consequently, the movement of the bracket 146 is in a sense opposite to the movement of the bracket 106 during this operation and during the following operation which restores the two brackets to their normal positions.

The drive system for the machine may be traced by reference to Figs. 2, 3, 5 and 13. Most of the drive system is shown in Fig. 3 to which reference may be made. In Fig. 3 a main drive shaft 156 is driven through a pulley 158 and a drive belt 160 which is operated by a motor (not shown). The main drive shaft 156 has a hypoid drive gear 162 fixed thereto. The hypoid drive gear 162 is in driving contact with a larger hypoid driven gear 164 which is fixed to one end of a drive shaft 166. About midway of the length of the drive shaft 166 is a worm gear 168 which in turn is in driving contact with a worm gear 170 and a second worm gear 172. The worm gears 170 and 172 are mounted respectively on the ends of feed roll shafts 170a and 172a, as best shown in Fig. 2 of the drawings. As seen in Fig. 3 of the drawings, the feed roll shafts extend into the machine where a pair of feed rolls is attached to each of the shafts.

In Fig. 3 the upper pair of feed rolls 170b and 170c are adapted to cooperate with a similar pair of feed rolls (the upper feed rolls only are rubber covered) which are positioned directly underneath the respective upper feed rolls. The feed roll pairs are in position to engage the leading edge of a card as it is fed through the feed throat of the feed magazine by the conventional picker knives 10. Affixed to the main drive shaft 156 at spaced points along its length are roll drive worms 174, 176 and 178. These roll drive worms are adapted to engage upper and lower feed roll shaft helical gears 180—182, 184—186 and 188—190 as shown in Fig. 13. The feed roll shaft helical gears 180 through 190 are fixed to the ends of feed roll shafts 192 through 197, respectively. It will be observed that the roll drive worms 174, 176 and 178 are positioned between the respective upper and lower feed roll shaft helical gears, so that upon rotation of the main drive shaft 156, these gears will be rotated.

Each of the feed roll shafts has a pair of feed rollers affixed thereto, upper and lower rollers of the pairs being in driving alignment with each other, so that a card engaged between the respective pair of rollers will be driven forward in known fashion. Thus, the feed roll shaft 192 has a pair of feed rollers 192a affixed thereto, the shaft 194 has a pair of feed rollers 194a affixed thereto, while the shaft 196 has a pair of feed rollers 196a attached thereto.

The feed roll shaft 197 has affixed thereto a pinion 198 which is located at its end extending from the forward side of the frame (Fig. 13). The pinion 198 engages an idler pinion 200 which in turn engages a pinion 202 which is attached to the end of a lower card roll shaft 204. The pinion 202 in turn is in driving engagement with an upper pinion 206 which is attached to the end of an upper feed roller shaft 208. Both the lower shaft 204 and the upper shaft 208 carries registering pairs of card feed rollers. The upper pair 208a which is on the shaft 208 is shown in Fig. 3. The main drive shaft 156 is also adapted to drive the stacker mechanism including the card feed rollers, a stacker drum and an off-take tractor, this mechanism being shown at the left in Fig. 3 and also in Fig. 5.

The main drive shaft 156 has attached to its inner end a stacker drive pinion 210 which is adapted to engage and drive a stacker drive shaft pinion 212 which is affixed to the stacker drive shaft 214. The opposite end of the stacker drive shaft 214 has attached thereto a stacker drive shaft gear 216 which is in engagement with a stacker feed roll drive gear 220.

Extending across the stacker structure are a plurality of pairs of stacker feed roll shafts. The upper and lower stacker feed roll shaft pairs are indicated by the reference numerals 222—224, 226—228, 230—232, 234—236 and 238—240. Each of the stacker feed roll shafts has attached thereto a stacker feed roll shaft gear, these being the gears 222a through 240a respectively, as shown in Fig. 5 of the drawings. Fixed to the drive shaft 218 and positioned between the respective pairs of stacker feed roll shaft gears are feed roll drive worms 242 through 250. It will be seen, therefore, that drive power applied to the shaft 214 will drive the pinion 216 and consequently the drive shaft 218 with the result that the respective feed roll drive worms 242 through 250 are driven, thereby imparting motion to the several feed roll shafts. Each of the feed roll shafts in the stacker mechanism has a pair of card feed rolls attached thereto, the rolls of the respective upper and lower shafts being in alignment with each other, adapting them to grip between the respective pairs a card fed from one set of rolls to another. In Fig. 3 of the drawings the upper feed roll shafts 222, 226, 230 and 234 are visible, and it will be seen by an inspection of this figure that the shafts have their own feed roll pairs 222b, 226b, 230b and 234b, respectively.

By reference to Fig. 5 it will be seen that the drive shaft 218 has a terminal worm 252 which engages a stacker drum gear 256. The stacker drum gear 256 is fixed to one end of a stacker drum shaft 254 which, by reference to Fig. 3, is seen to support for rotary movement a stacker drum 255 which in its general aspects is known to the art.

Once more, by reference to Fig. 3 of the drawings it will be seen that the stacker drum shaft 254 extends beyond the opposite side of the machine frame where a beveled gear 258 is affixed thereto. The beveled gear 258 is in driving contact with a clutch shaft gear 260 forming a part of a control clutch 262 shown in Fig. 3a, where it will be recognized as of conventional structure by those skilled in the art. The clutch 262 controls the rotation of a clutch drive shaft 264 which has attached to one end thereof a worm gear 266 which is in driving contact with a tractor drive gear 268. The tractor drive gear 268 is attached to one end of a tractor shaft 270 which may be seen by reference to Fig. 3. Fixed to the tractor drive shaft 270 are a pair of tractor belt drive sprockets 272 and 274, as may be seen in Figs. 5 and 12.

Figure 1:
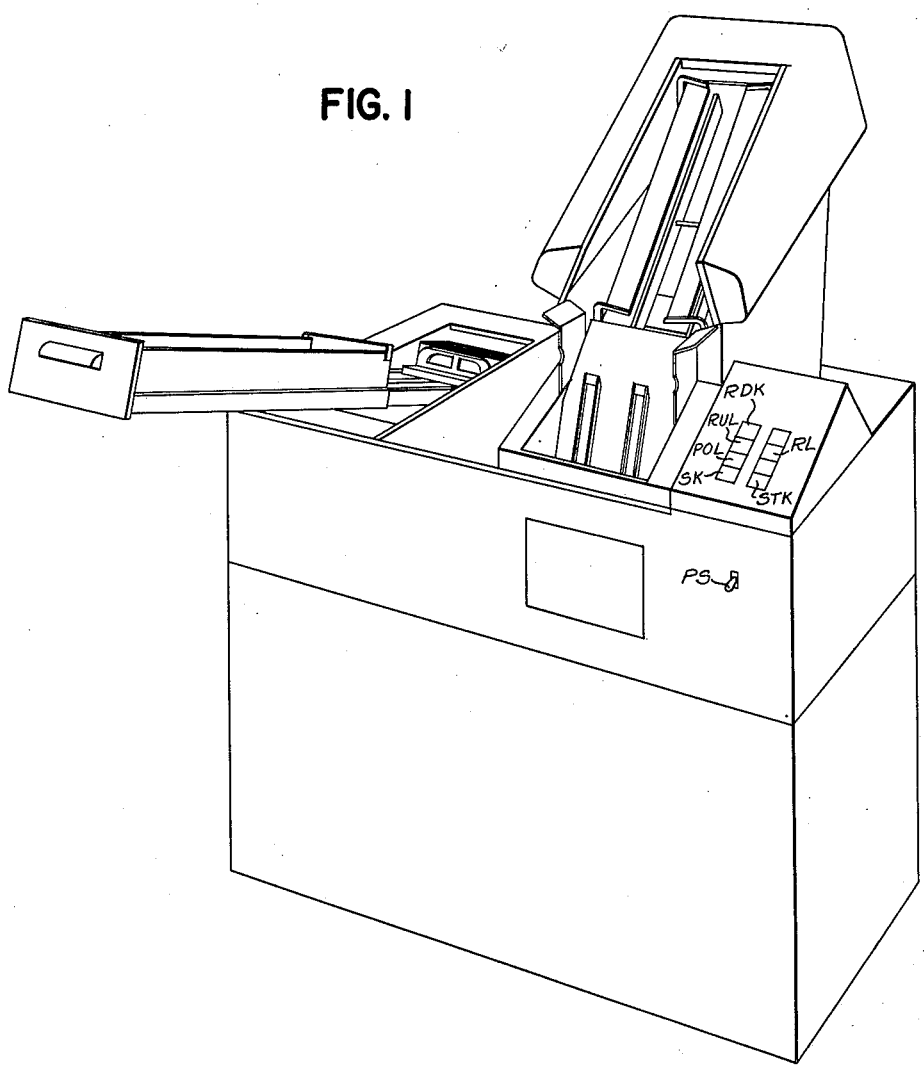
Fig. 1 is an external perspective view of the card feeding device comprising the present invention.

The off-take or stacker rack is generally similar to the loading rack previously described. The rack comprises a pair of angle-shaped bars which are supported in an upwardly inclined direction and which are open at the upper end for the reception of a file drawer as shown in Fig. 1. The horizontal angles of the stacker rack frame form the bed on which cards being discharged from the stacker drum are supported, and as shown in Figs. 5 and 13, the tractor belt 276 which is trained about the tractor belt sprockets 272 and 274 at the lower end of the stacker rack, extends upwardly to a point where it is trained about a second pair of tractor belt sprockets 278 and 279. A stacker card support 280 is adapted to move freely along the rails of the stacker rack assembly, moving progressively upwardly along the inclined stacker rack as an accumulation of cards takes place between its inner face and the rotary stacker drum.

When a number of cards determined by the distance between the movable blades 102 and 104 and the rubber card stop surface 144 is dropped into the card feed magazine 281, the picker knives 10, which are mounted for reciprocating movement in the feed magazine, will feed these cards, one at a time, through the feed throat 286 (Fig. 6), where the cards are successively engaged by the feed rollers 170b and 170c and their lower companion feed rollers.

The picker knives 10 are operated in known manner and it is, therefore, sufficient to say at this point that the knives 10 are connected to an oscillating picker knife lever 282 which is oscillated by a picker drive shaft 284, thereby reciprocating the knife 10 to feed the cards through the feed throat in seriatim order.

In order to stop the feeding of cards when necessary in a very short period of time and in order to keep cards from feeding until the machine is in readiness, there has been provided in the feed magazine a plurality of card supports 288 (Figs. 6 and 6a) which are adapted to project upwardly in a plane somewhat above the plane of picker knife operation and thereby hold the rear edge of the cards in an elevated position where are are free of the picker knives. The card supports 288 are attached to a support frame 290, and this entire frame is adapted to be pulled down by a pair of solenoids 294 and 296. The solenoids 294 and 296 are energized whenever the machine is in operation and, therefore, the card supports 288 will be withdrawn to a point below the plane of picker knife operation, where they will not interfere with the normal operation of card feeding. When the solenoids are deenergized, a spring 292 will assist in biasing the support frame 290, and consequently the card supports 288 in an upward direction where they are rendered operative.

Figure 16:
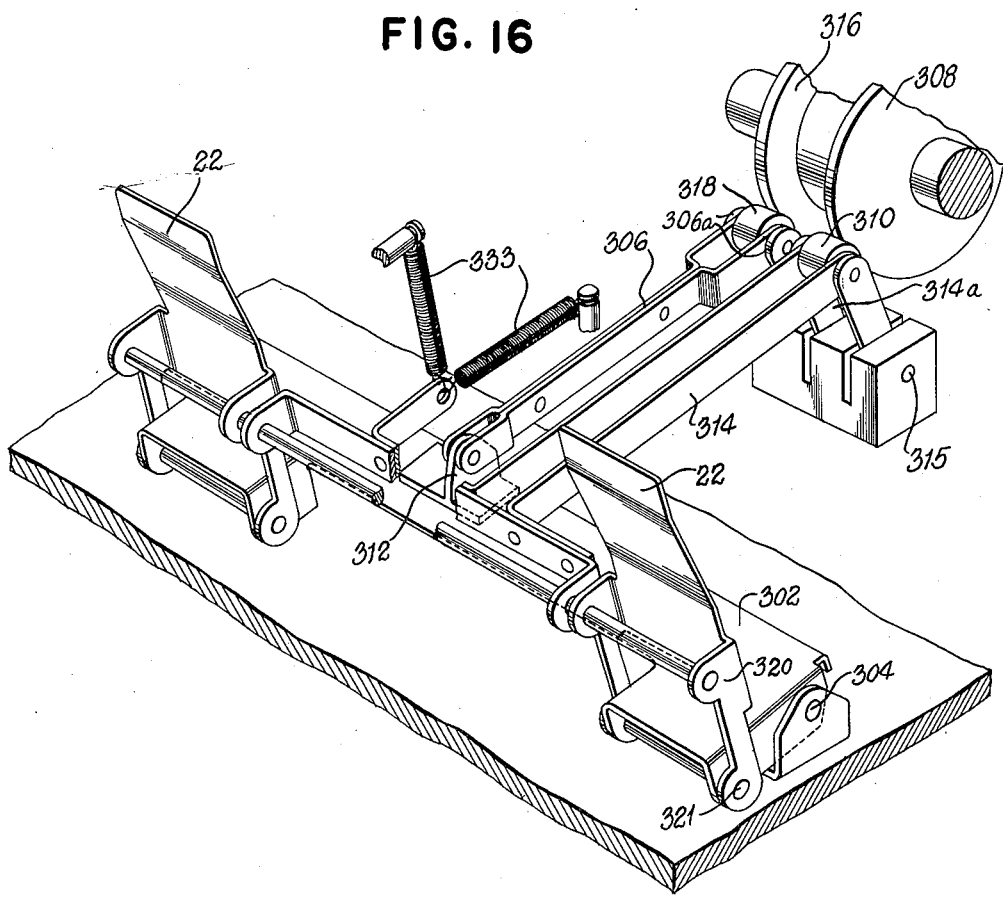
Fig. 16 is a perspective view of the card pusher mechanism shown in Fig. 7.

It has been mentioned heretofore in connection with the brief description of Fig. 3 that the cards are fed from the magazine into a position where they must be moved perpendicular to their original line of feed and that these cards are then fed in the new direction until they reach the stacker assembly, where the direction of the cards must once more be changed in direction perpendicular to that previously existing. For the purpose of feeding the cards in a different direction, i. e. for the purpose of changing the direction of feed, there has been provided herein a pair of card pushing assemblies (Figs. 7 and 16). Both card pushing assemblies are of the same structure (except for the number of pushing fingers) and it will, therefore, suffice at this point to describe in detail the structure which is found at the junction of the stacker assembly and the card reading course. With particular reference to Figs. 7 and 16 of the drawings, it will be noted that a card pusher finger 22, of which a plurality may be provided at either direction changing station, is provided and adapted to operate in a slot 300 in the bed plate of the card course. The card pusher fingers 22 are based on a pusher plate 302 which is adapted to rock about a pivot shaft 304.

Since it is necessary to impart a compound movement to the pusher fingers 22, mechanisms have been provided whereby the finger is first elevated and then reciprocated in a forward direction. This is effective to project the finger 22 upwardly across the plane of a card on the card bed, thereafter the finger being moved in a forward direction to feed the card into the cooperating pair of feed rolls 222b and 224b.

The necessary movement is provided for the pusher fingers 22 by means of an elevating lever 306 and a reciprocating lever 314. The elevating lever 306 is mounted on an upstanding bracket 306a. The bracket 306a has two parallel legs which act as a pivot for the elevating lever 306 and which pivot mounts the elevator lever cam follower 318. The cam follower 318 is adapted to ride in contact with the elevating cam 316.

The bracket 306a is mounted on a lever mount pivot rod 315. The pusher finger base 302 has an elevating lever finger 312 extending upwardly therefrom, and the forward end of the elevating lever 306 is pivoted to the upstanding finger 312.

It will also be seen that the mechanism for imparting reciprocating movement to the card pusher fingers 22 includes a reciprocating lever 314 which has one end thereof pivoted to a reciprocating lever mounting bracket 314a. The reciprocating mounting bracket 314a has two substantially parallel legs which are mounted on the lever mount pivot rod 315. These two parallel legs act as a pivot for the reciprocating lever 314 and also mount the reciprocating lever cam follower 310. The cam follower 310 is adapted to ride in contact with the reciprocating cam 308.

It will be noted that the card pusher finger 22 is an upward projection of a base or support portion 320 which is pivoted for rocking movement on a stud 321 in the pusher finger base plate 302. The entire assembly is biased about the pivot point 304 by means of a biasing spring 333.

The timing of the cams 316 and 308 is such that the base plate 302 is first rocked about its pivot pin 304, thereby elevating the pusher finger 22 through the plane of a card on the card bed. Thereafter the cam 308 becomes operative on the reciprocating lever 314, so that the card pushing finger 22 is moved in a forward direction about the pivot point 321. The cams 308 and 316 are so formed that the return movement of the pusher fingers 22 is in substantially the same direction, i. e. the fingers first move downwardly out of the plane of the cards being fed from the card magazine and then back to their starting point.

Figure 8:
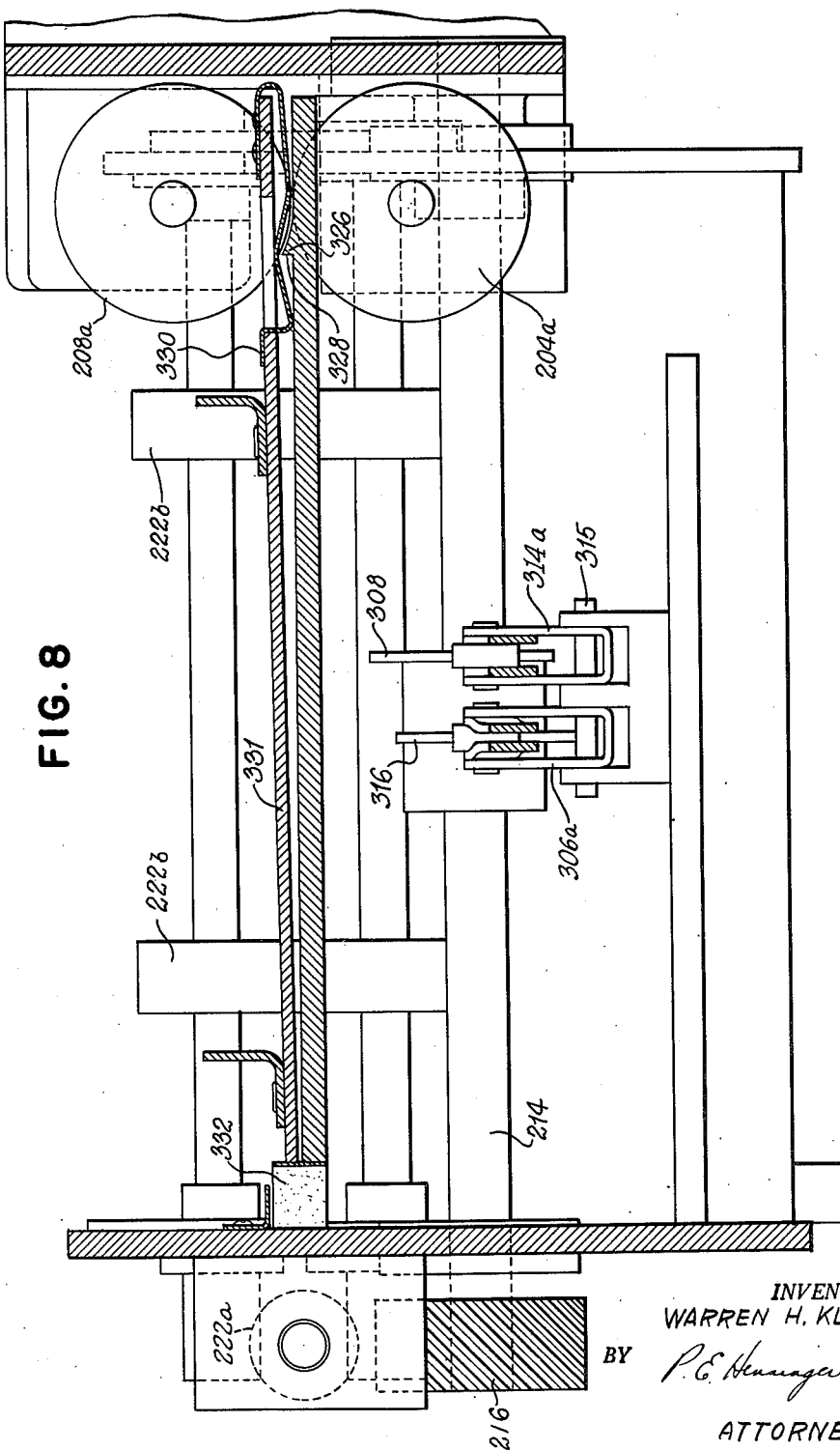
Fig. 8 is a sectional view on line 8—8 of Fig. 7.
Figure 22:
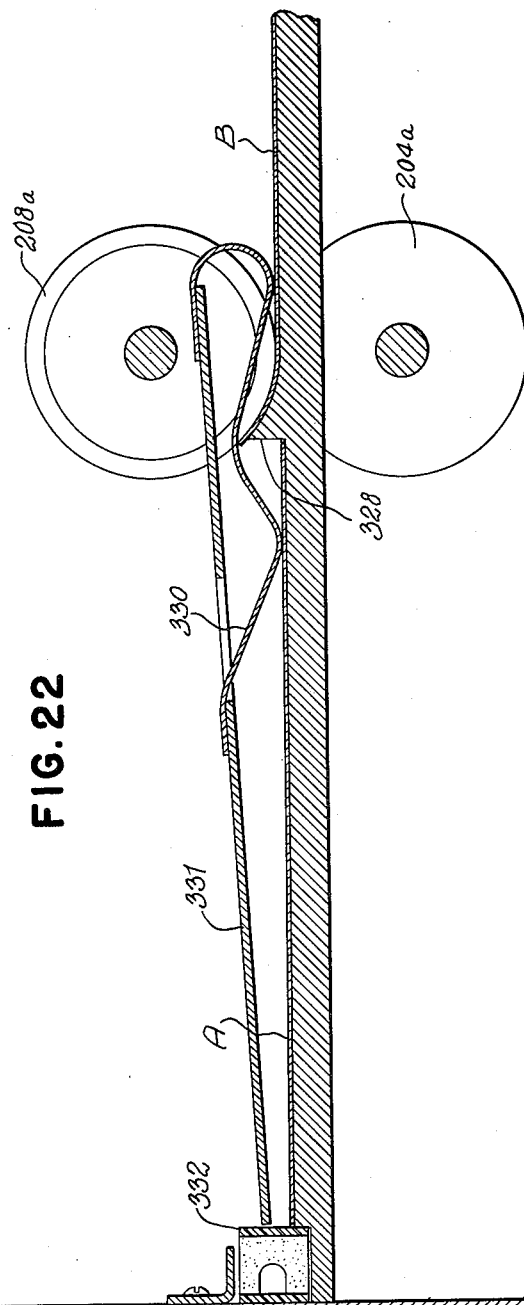
Fig. 22 is an enlarged sectional view through the end of the card reading station course intended to show the mechanism for feeding moving cards in overlapped position.

At the junction of the card reading bed and the stacker assembly, it is necessary to feed the cards in an overlapped position and the mechanism for achieving this end is shown in Figs. 8 and 22.

By reference to Fig. 22, it may be assumed that a card A is stationary in the position shown, card B will enter below the cover plate and will therefore be above card A. This is accomplished by the curve in the card bed, which has the same radius as feed rollers 208a. Card B as it enters the feed rollers 208a and 204a moves around the curved card bed and the leading edge is deflected toward card A by the cover plate 331 and the leaf springs 330 which are carried by the cover plate. Since card A is held against face 328, card B is already started over card A. As the trailing edge of card B passes the center line of the feed rolls 208a and 204a, card B is then continuing forward due to the spring-loaded force of the rubber coated roll 208a compressing card B between itself and the curved card bed. As the trailing edge of card B reaches the top of the abutment 328, it drops off the curved card bed. The inertia of the card projects it against a card bumper 332. This bumper stops the card with little damage by compressing and returns the card against the abutment 328. The card is now in position to be fed in a forward direction by the feed roll set 222b and its related lower set. As the card feeds toward the rear of the card stacker assembly, it is fed between a pair of guide plates 334.

The stacker drum 255 is shown in Fig. 3 of the drawings, but more details thereof are shown in Fig. 9. By reference to Fig. 9 it may be seen that the stacker drum comprises a stacker drum frame 336. The frame is mounted on the shaft 254 by means of which it is rotated. The frame 336 is adapted to mount a plurality of finger mount shafts 338. Each of the finger mount shafts 338 has attached thereto four finger mounts 340, each one of which has a resilient card gripping finger 342 which in its card retaining position is adapted to lie with its free end against a card support plate 344.

The finger mounts 340 are adapted to be rocked by a fixed cam 348. As a result of the structure provided, each of the outer finger mounts 340 has projecting from one edge thereof a cam following roller 346 which is adapted to ride in contact with the periphery of the cam 348. Contact between the cam following rollers 346 and the card gripping finger operating cam is normally maintained by means of a finger mount control spring 350 which has one end thereof connected to the card finger mount 340 and the other to a stud extending from the stacker drum frame.

The shape of the cam 348 is such that the card gripping fingers 342 are in their closed position throughout the larger portion of their travel. However, as the stacker drum frame is rotated in respect to the stationary cam 348, the following rollers 346 will reach a point A, where the cam surface rises and the card gripping fingers begin to open. This rise in the cam continues to a point B where it reaches a maximum and at which point the grip fingers are open to their maximum extent. With the gripping fingers open in this position, which is a position in substantial alignment with the card feed course between the rollers 238b and 240b, cards issuing from the rollers are projected forwardly to a position between the card gripping finger and the card support 344 which is associated therewith. Immediately after passing the point B on the cam 348, there is an abrupt shortening in the cam radius so that the spring 350 can effectively draw the card gripping finger into closed position, gripping therebetween and against the card support 344 a card which has been deposited as described.

From the point B to the point of discharge of cards, the radius of the cam 348 is substantially equal at all points thereof. As a card is carried around to the point where the bottom edge thereof engages the rails of the card stacker rack where such contact effectively strips the card from the card gripping fingers and the cards are deposited on the rails of the stacker rack in position to be removed therefrom.

Mounted in front of the stacker drum frame and extending just slightly beyond the maximum circumference thereof is a pressure plate 352. This plate is pivoted on a pressure plate mounting shaft 354 and the plate is biased about the shaft 354 by means of a pressure plate bias spring 356. As cards are deposited on the stacker rack rails and the pressure thereof builds up against the pressure plate 352, the pressure plate is forced in a counterclockwise direction about its pivot pin 354 and thereby effectively closes a microswitch contact SPC which will energize the clutch mechanism 262 and cause the traction belt 276 to move forward, thereby moving any accumulation of cards in front of the stacker drum away therefrom and relieving the pressure on the pressure plate 352. When this pressure is relieved, the microswitch contact SPC will be opened once again to deenergize the clutch mechanism 262 until such time that pressure once more builds up.

Before engaging in a discussion of the operation of the machine, it might be well to consider the physical location and the general function of certain of the electrical control devices which are necessary to such further discussion.

By reference to Fig. 1 of the drawings it will be noted that a power switch PS is located on the front of the machine. This switch, when closed, will place 40 volts on the control circuits and energize relays R19, R21 and R23. Immediately above the switch PS is a control panel which contains a number of control keys and certain signal lights which are as follows: The key RDK is the rack down key which, when closed, picks up a relay R22. A signal light RUL is illuminated whenever the rack is up. A second signal light POL is illuminated whenever power is on in the machine. Immediately below the power on light is the start key SK. When the start key SK is depressed, it picks up a relay R5. In the second bank of controls is a signal light RL, which is the ready light, indicating that the system is in order for operation. At the bottom of the second row of controls is a stop key STK which, when closed, controls and energizes a stop relay R11.

The base plate 32 serves as a mount for three control contacts DOC, FC–a and FC–b. When the file drawer is placed on the feeding rack and contacts DOC contact, thereby closing the same, power is applied to the fingers motor FM. The FC–b contact, when closed, picks up a relay R20.

At the bottom of the feed rack are two contacts RDC–a and RDC–b. These contacts are respectively a pair of rack down contacts whereof the contact RDC–a opens and drops a relay R22 and the RDC–b contact closes and picks up a relay R24 through FC–a. At the top of the metering throat (Fig. 2) are shown two contacts REC–a and REC–b. These contacts are a pair of rack empty contacts. The rack empty contact REC–a closes when the metering throat becomes empty and completes the circuit to the rack motor RM, while the rack empty contact REC–b opens as cards enter the metering throat and drops out the relay R19.

Fig. 6 of the drawings includes the front cover contact FCC, which is normally closed, but which is opened by closing the card feed magazine door. If the door is inadvertently opened while the machine is running, the FCC contact will close, picking up the stop relay R11. A metering cam MC, which is on the shaft 110 of Fig. 4a, controls the card metering clutch.

In Fig. 3 an anti-jam card lever AJL cooperates with a pair of cam operated contacts SBC and AJC to control a relay R8. The anti-jam lever AJL picks up the relay R8 when a card passes under AJL, and the space between card cam contact operated by the space between card cam SBC holds the relay R8 at points between cards, i. e. at such times when the anti-jam card lever AJL is ineffective. This puts the run relays R6, R7 and HD1 under the control of R8. If the anti-jam card lever fails to close, the R8 relay drops, stopping the machine. In Fig. 3 a cam CC operates a counter cam contact which is in control of a mounting mechanism (not shown) which effectively counts the cards that are passed through the card feed system.

In Fig. 9 of the drawings the stacker plate lever 352, which has been described hereinbefore, bears against a stacker plate contact SPC so that when the pressure of cards being discharged onto the stacker rack becomes sufficient, the plate 352 will move in a counterclockwise direction and close the normally open contact SPC which is in control of the clutch which operates the stacker traction belts.

When the power switch PS (Fig. 1) is closed, the 40 volt power needed for energizing various relays, etc. is imposed on the control system lines. As soon as the switch PS is closed, the relays R19, R21 and R23 are energized. Pick-up of the relay R19 will transfer its 19AU and 19AL points and thereby reverse the starting winding of the fingers motor FM. The 19BU and 19BL points will also be transferred to reverse the starting windings of the rack motor RM. Energization of the relay R21 will result in the opening of its 21BL points, and the closing of its 21AL points. Energization of the relay R23 closes its 23AL and 23BL points. The 23AL and 23BL points keep the power from getting to the motor circuits until the relay R19 is in position.

When a drawer of cards is put on the loading rack, the end of the drawer will close the drawer on contact DOC which will apply power to the fingers motor FM, with the result that the fingers 42 and 44 are rotated in the card retaining position shown in Fig. 20. As the fingers rotating shafts 38 and 40 rotate, a lug on the gear 46 will close the fingers contact FC–b which picks up the relay R20.

Energization of the relay R20 will open its 20BU and 20BL points and close its 20AL and 20AU points. Opening of the 20BU points opens the circuit to the fingers motor FM, thereby causing the fingers 42 and 44 to stop in the card retaining position as shown. Relay R20 holds through its closed 20AL points and the rack empty switch REC–b which is normally closed. The opening of the 20BL points drops the relay R19, thereby reversing the starting winding of the fingers motor FM and the rack motor RM.

It may be assumed that the machine is now loaded with cards to be processed and that everything is otherwise in condition for the feeding of cards. Depression of the rack down key RDK picks up the relay R22, which holds through its 22AL points, both its 22AL and its 22BL points being closed when the relay is energized. The closed 22BL points close the circuit to the rack motor RM, which will now operate through drive pinion 90, the gear 92, the pinion 94 and the toothed rack 98 (Fig. 2), and will lower the card feed rack to its full line position in Fig. 2, which is the position at which cards may be discharged into the intermediate metering hopper.

When the card feed rack reaches its card feeding position, its rails will contact the rack down switches RDC–a and RDC–b. The switch RDC–a is normally closed and will, therefore, be opened; the switch RDC–b is normally open and will therefore be closed. Opening of the rack down contact RDC–a breaks the circuit to the relay R22 which, because of the opening of its 22BL point, will break the circuit to the rack down motor RM, thus stopping its operation.

The closure of the rack down contact RDC–b picks up the relay R24 which closes its normally open 24AL points and re-establishes a circuit to the fingers motor FM. Since the starting winding of the fingers motor FM is now reversed, the motor will drive the fingers operating shafts 38 and 40 to retract the fingers 42 and 44. The fingers contact FC–a will now be opened by a lug on the gear 46. Opening of the fingers contact FC–a will break the circuit to the relay R24 resulting in the opening of its 24AL contact and the closure of its 24BL contact. Opening of the 24AL contact breaks the fingers motor circuit and causes it to stop.

With the fingers 42 and 44 withdrawn into their retracted position, cards will now discharge from the card feed rack into the intermediate card metering hopper. The cards will drop to the card supporting blades 102 and 104. As the cards enter the metering hopper, they will open the normally closed rack empty contacts REC–a and REC–b. The rack empty contact REC–b will break the circuit to the relays R20 and R21. When 20BL point closes upon dropping of the relay R20, this point picks up the relay R19 which, as noted before, will reverse the starting winding of the fingers motor FM and of the rack motor RM. As the last card leaves the feed rack, the contacts REC–a and REC–b will once again close, and closure of the contact REC–a will close the circuit to the rack motor RM, thus elevating the card feed rack to the dotted line position of Fig. 2.

Now when the start key SK is depressed, relay R5 will be energized. The normally open 5AL and 5BL points will be closed. Closure of the 5AL points picks up the relay R6, thus closing its normally open 6AL, 6AU and 6BU points. The relay R6 (Hold), relay R7 and the heavy duty relay HD are energized through the closed 6AL points, the closed 12BL points and the closed 9BU points. The heavy duty relay HD1 closes the circuit to the drive motor and driving power is transmitted through the belt 160, the pulley 158 and to the drive shaft 156. The machine is now conditioned to feed cards.

The closed 6BU points complete a circuit to the thermal relay R17, and when the 17BU points are closed by its relay R17, the card feed stop solenoids 294 and 296 (Fig. 7) are energized with the result that the card supports 288 are lowered, so that the cards in the feed magazine are in contact with the feed knives 10. Cards will now be fed in succession through the card throat 286 and into the card drive rollers 170b and 170c.

The cards are delivered by the rollers 170b and 170c into the card reading course comprising the sections 12 and 18 (Fig. 3). In section 12 the cards must undergo a change in their direction of travel. This function is obtained by the card pusher finger 14, in the manner heretofore described. The finger 14 will engage one end of the card and push it forward into the card feed rollers 192a by which they are discharged into the card reading station (Figs. 17 and 18).

Figure 17:
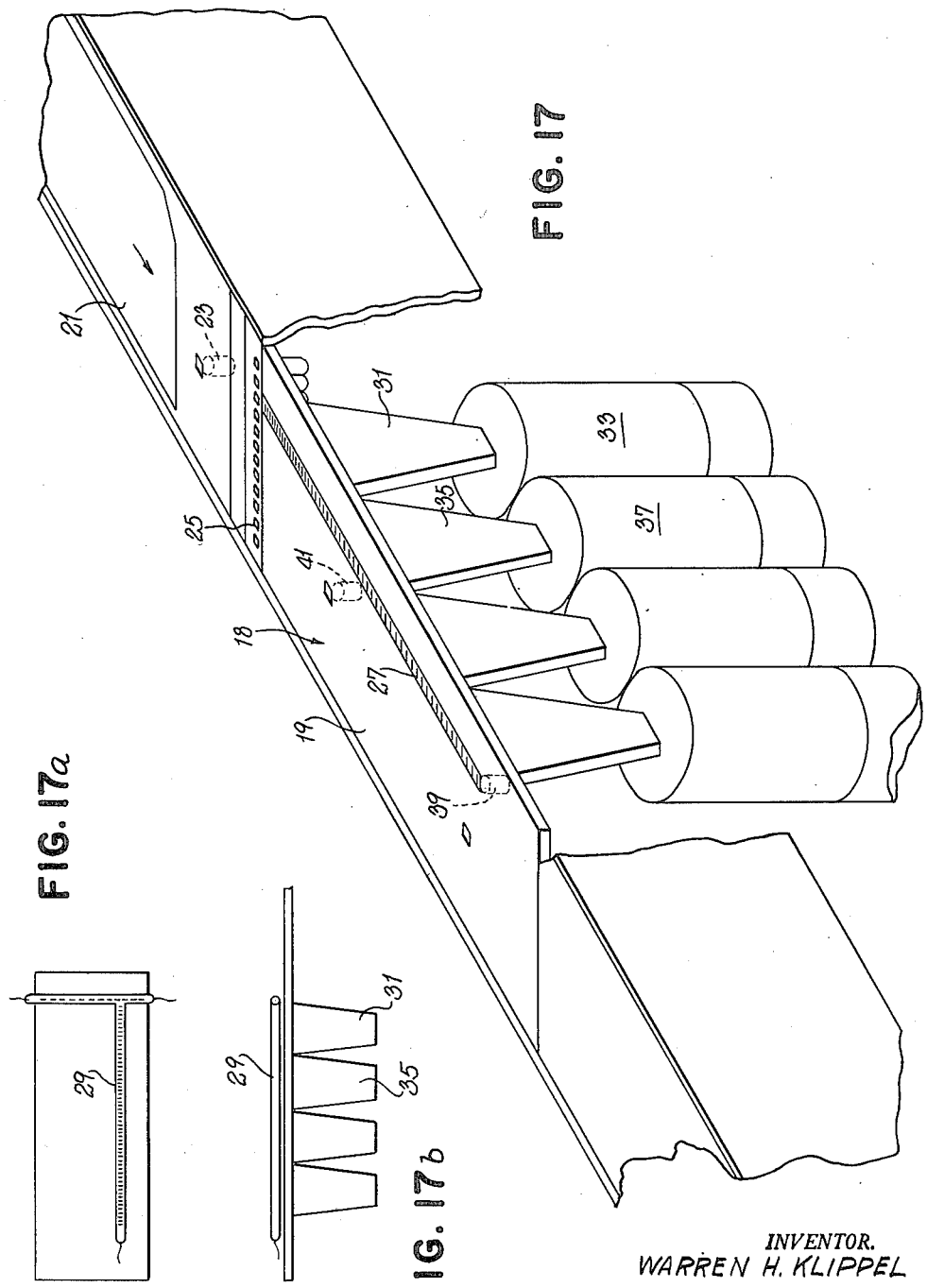
Fig. 17 is a perspective view of a tabulating card reading station.
Figure 18:
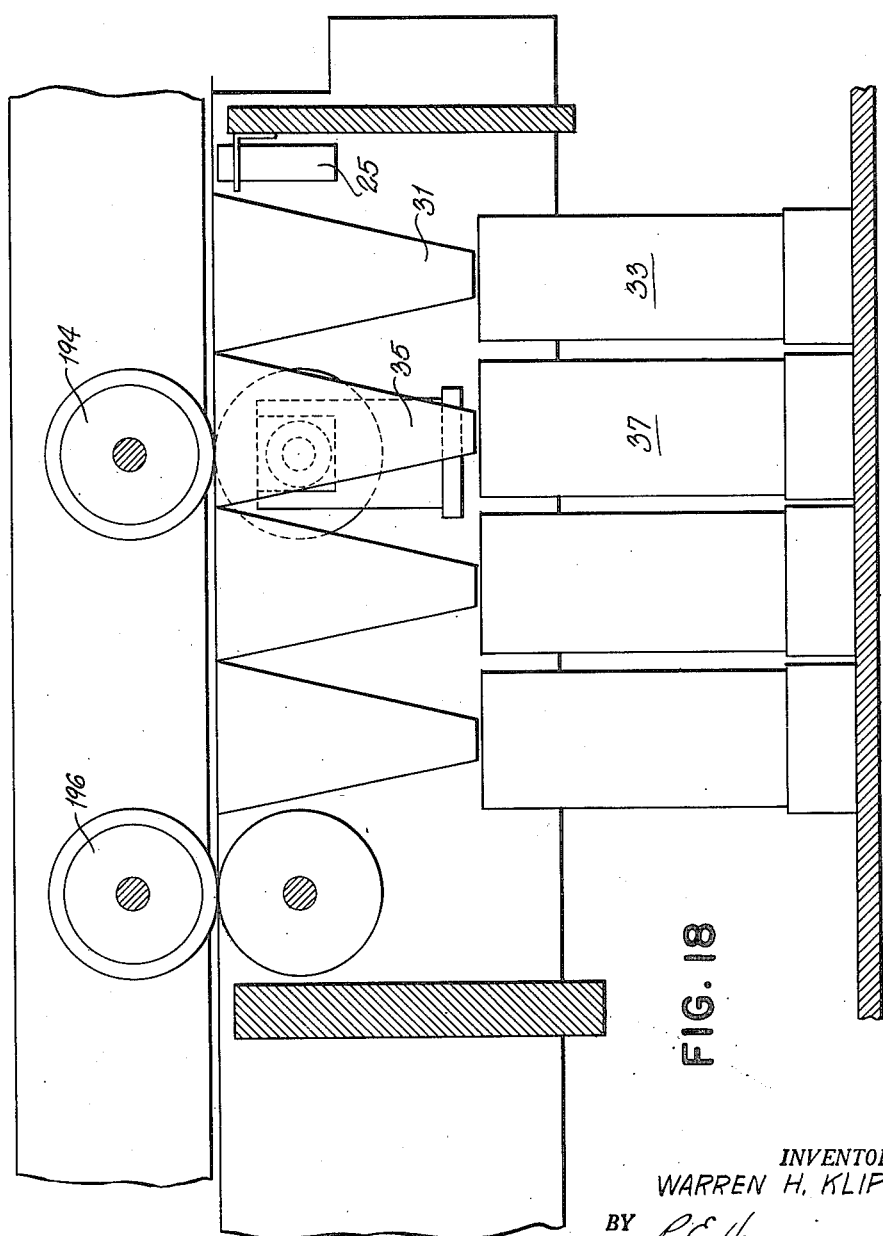
Fig. 18 is a cross-sectional view through the card reading station showing, however, in full lines a series of light collecting prisms and associated photomultiplier tubes.

The nature of the card sensing station 18 is best illustrated in the perspective view of Fig. 17. There is provided a longitudinal card bed 19 of a width substantially to accommodate a punched tabulating card 21, and to prevent undue skewing thereof as it travels in the direction indicated by the arrow thereon. Disposed in the path of card travel is a photocell 23 which, when triggered by the advancing card 21, serves to provide an electrical impulse used to control the starting and stopping of the reproducing unit with which this card feed mechanism is to be associated.

Spaced from the photocell 23 and perpendicularly disposed across the path of card travel is a single column of twelve individual data sensing photocells 25, suitably located to sense the punched index points in the twelve rows of a standard tabulating card such as used in the Hollerith punch card system.

Disposed perpendicularly to and spaced a predetermined distance from the line of data sensing photocells 25 is a longitudinally disposed timing track 27. The timing track is formed of 82 separate and narrow light transmitting slots which are located in the land space between two successive rows on the card or in the land space between two adjacent data sensing photocells, preferably between the 11 and 0 card column position or the corresponding data sensing photocells 25.

Disposed about the single column of data sensing photocells and the slotted timing track 27, as shown in Figs. 17a and 17b, is a suitable light source 29 preferably having an output in the blue region (4800±500 angstrom units) of the spectrum.

Disposed beneath the first twenty-one slots of the timing track 27, which twenty-one slots correspond to the card columns 0 (zero) and 1 through 20, inclusive, is a light collecting, focusing and transmitting prism 31 and a photomultiplier tube 33. Similarly disposed beneath slots twenty-two through forty-one of the timing track 27, which slots correspond to card columns 21 through 40, is a second prism 35 and a second photomultiplier 37. In similar manner, focusing prisms similar to 35 and photomultipliers similar to 37 are disposed beneath the remaining portions of the slotted timing track 27 and correspond to card columns 41 through 60 and to 61 through 80, respectively. The last slot of the 82 slot timing track 27 is provided with a separate card sensing photocell 39 disposed therebeneath. Also included in the bed 19 is a second photocell unit 41 which operates in conjunction with the photocell unit 23 to control the stopping and starting of the reproducing device.

In operation of the sensing station, the cards are fed lengthwise past the data sensing photocells 25. With no cards in the system, light from the light source 29 is transmitted through all the slots in the timing track 27 onto the photomultiplier 33, etc., located therebeneath, with the prisms 31, etc., serving to collect and focus the transmitted light from the respective slot groups. As a card passes along the card bed 19, the timing track 27 locates the leading edge of the card relative to each column that is being read in the sensing station. As the card 21 advances, the leading edge thereof successively and sequentially covers the slots in the timing track 27 and thus there results a progressive diminution of the light falling on a particular photomultiplier. As the slots in the timing track are of a discrete nature, the stages of the progressive diminution of the light transmitted to the photomultipliers are incremental and distinct and can be readily transformed into a stepped voltage wave, the individual steps of which correspond to the individual slots in the timing track 27 being covered by the advancing card.

The output signals from the photomultiplier, etc., can be differentiated, and the differentiated pulses can be applied to a system such as that described in the concurrent application of Wilmur M. McMillan and Edward S. Wilson, Serial No. 401,464, filed December 31, 1953, for timing the reproduction of data in a reproducing device such as a magnetic tape recorder or the like. The light falling upon the respective photocells 25 is used to control the reinscription of data in a reproducing device such as a magnetic tape recorder, for example, as described in the aforesaid application for patent.

The cards are fed through the reading station 18 by the feed rollers 192a, 194a, 196a and 208a, and their associated lower pairs. The card feed rollers 208a discharge the cards into the zone formed by the junction of the card reading course and the card stacker course.

In the zone of juncture the cards must once more undergo a change in their direction of travel. To this end the card pushing fingers 22 will be raised above the back edge of a card and will then move forward a sufficient distance to deliver the card to the card feed rollers 222b and their associated pair.

Since the preceding card will not have cleared the feed rolls 222b before a succeeding card is delivered by the feed rollers 208a and their associated pair, provision must be made for overlapping moving cards in the juncture zone. The method employed will be clear from an examination of Fig. 22. Assuming card A to be stationary in the position shown, card B will enter below the cover plate and will be above card A. This is a result of the curve in the card bed which has the same radius as the feed roller 208a. Card B as it enters feed rollers 204a and 208a is moved around the curve in the card bed and the leading edge is deflected toward card A by the cover plate 331 and the leaf spring 330. Since card A is held against the abutment 328, card B is already started over card A. As the trailing edge of the card B passes the center line of the feed rollers 204a and 208a, card B is projected forward due to the spring-loaded force of the rubber coated feed roller 208a compressing the card between itself and the curved card bed. As the trailing edge of the card B reaches the top of abutment 328, it drops off the curved card bed section. The inertia of the card continues it in its course and projects it against the card bumper stop 332. This stop brings the card to a halt with no damage by compression and returns the card into contact with the abutment 328.

As the cards are fed forward by the card rollers 222b and their associated pair, the cards pass between a pair of plates constituting a card guide 334. The card rollers 226b, 230b, 234b and 238b, together with their associated pairs feed the cards through the card stacker assembly.

The first card under the anti-jam lever AJL will operate the lever so that an associated anti-jam contact is closed. The closing of the anti-jam contact will pick up the relay R8 through the 9BL and the 10AL relay points. The now closed 8BU point will close a circuit to energize the relay R9. The relay R9 is held through its own 9AU points and through the closed 6AU points. As long as the cards are feeding with regularity, the relay R8 is held alternately by the space between card cam contact SBC and the anti-jam lever AJL contact. In other words, the anti-jam card lever AJL contact holds the relay R8 energized whenever a card is under the lever, but when no card is under the lever the circuit for the relay R8 is broken at the point of the AJL contact. Therefore, the circuit is maintained for the space between cards by the space between card SBC contact during the intervals between cards when no card is under the anti-jam lever.

As soon as the relay R8 is energized, it controls the run relays through its 8AL points. If the anti-jam card lever AJL fails to close its contact, the relay R8 is de-energized. If the anti-jam card lever contact is not opened by the cards, the relay R10 is picked up through operation of the anti-jam cam AJC. Energization of the relay R10 will open its 10AL points which will break the circuit to the relay R8.

Normally the feed of cards is stopped by energizing the relay R11 which stops the feed of cards by deenergizing the solenoids 294 and 296 (Fig. 6a). This will allow the card supports 288 to rise and move the cards out of the effective orbit of the feed knives 10.

As the last card leaves the anti-jam lever AJL, dropping of the relay R8 stops the operation of the machine. This assures that the last card is read at the normal high reading speed. If the first card fails to feed, the stop key STK may be operated to drop out the run relays. The operation of the stop key results in the closure of the 12BL relay points.

As the cards are being fed through the feed roller pairs 234b—236b and 238b—240b in the card stacker assembly, the rotary stacker drum 255 is constantly rotating. The cam followers 346 of the finger mounts 340 are in constant contact with the fixed cam 348 by virtue of the tension of the finger mount control springs 350. As the drum 336 rotates a follower 346 to the point A on the periphery of the fixed cam 348, the card gripping finger associated therewith begins to open because of the longer cam radius. By the time a card gripping finger assembly has reached the point B on the cam 348, its finger 342 will be opened and the space between the finger and its associated card support 344 will be in the line of discharge of the card feed roller pair 238b and 240b. A card issuing from these rollers will be projected into the open stacker drum finger which immediately thereafter passes the point B of the cam disc, where the shorter radius of the cam permits the card gripping finger to close. From this point on, the card gripping finger will remain closed and carry the card to the stacker assembly rack where engagement between the bottom edge of the card and the rails of the stacker card rack serves to strip the card from the card gripping finger.

The cards being discharged onto the stacker assembly card rack have, as stated before, a tendency to accumulate at the point of discharge directly in front of the stacker drum and this tendency is aggravated by the fact that the stacker assembly card rack is inclined upwardly from the horizontal. In order that such accumulation of cards, to the extent of interfering with the operation of the rotary stacker drum, may be avoided, the pressure plate 352 will yield in a counterclockwise direction to close the stacker plate contact SPC. The stacker plate switch SPC will energize a stacker clutch magnet SC which will operate the tractor belt 276 until the load on the stacker plate 352 is removed.

The relay R7, through its 7BU points, closes the circuit to the magnet MCM of the metering clutch 132

(Fig. 2). The control circuit comprises the 7BU points, the normally closed metering control contact MCC, the 11BL points, the 18BL points, the timing motor TMC-2 contact, the metering cam MC contact and the metering clutch magnet MCM. This one operation of the metering clutch magnet MCM opens the metering blades 102 and 104 and transfers the metering cam MC contact to its other side. It has been shown how the movable rubber card stop 144 operates in conjunction with the metering blades 102 and 104 to hold the card column while the knives are releasing a measured number of cards into the card feed magazine. The cards falling into the feed hopper operating the metering control contact MCC (Fig. 6), closes the metering blades by giving the clutch magnet MCM another impulse through the metering cam MC contact. When the metering control contact MCC calls for more cards and none drop, the points 25AL start the timing motor TM-1. The timing motor TM-1 contact TMC-1 closes after a timed delay and energizes the relay R18. The relay points 18AL give the metering clutch magnet MCM an impulse, thereby closing the metering blades. The relay points 18BL prevent the metering clutch magnet MCM from receiving further impulses. The points 18BU drop the card feed solenoids 294 and 296. During the time that the cards are dropping onto the metering blades 102 and 104, the blades are kept from opening by the timing motor TM-2 contact TMC-2. The opening of the FC-a contact, when the card retaining fingers 42 and 44 are down, drops relay R24 causing contacts 24BL to close. The closing of contacts 24BL energizes the timing motor TM-2.

While there have been shown and described and pointed out the fundamental novel features of the invention as applied to a single modification, it will be understood that various omissions and substitutions and changes in form and details of the device illustrated and in its operation may be made by those skilled in the art without departing from the spirit of the invention. It is the intention, therefore, to be limited only as indicated by the scope of the following claims.

I claim:

1. In a tabulating card feeding device, a loading rack comprising a plurality of rails adapted to support a card file drawer by engagement with complementary surfaces thereof, a base plate supporting said rails in cantilever fashion, a card retaining finger mounted for rocking movement at the free end of each of said rails, a reversible motor for rocking said fingers into and out of the plane of cards deposited on said rails, means for mounting said rack for rocking movement, a card feeding magazine, and means for rocking said rack from a card loading position to a card discharging position in registration with said card feeding magazine.

2. In a tabulating card feeding device, a loading rack comprising a plurality of rails adapted to support a card file drawer by engagement with complementary surfaces thereof, a base plate supporting said rails in cantilever fashion, means for mounting said rack for rocking movement, card retaining bars mounted along said rails for movement into and out of card overlying position, means responsive to rocking movement of said rack for actuating said bars into and out of their operative position, a card feeding magazine, and means for rocking said rack from a card loading position to a card discharging position in registration with said card feeding magazine.

3. In a tabulating card feeding device, a loading rack comprising a plurality of rails adapted to support a card file drawer by engagement with complementary surfaces thereof, a base plate supporting said rails in cantilever fashion, a card retaining finger mounted for rocking movement at the free end of each of said rails, means for rocking said card retaining fingers into and out of the plane of cards deposited on said rails, the means for rocking said fingers into the plane of said cards comprising a contact operable by a file drawer when supported on said rails, means for mounting said rack for rocking movement, a card feeding magazine, and means for rocking said rack from a card loading position to a card discharging position in registration with said card feeding magazine.

4. In a tabulating card feeding device, a loading rack comprising a plurality of rails adapted to support a card file drawer by engagement with complementary surfaces thereof, a base plate supporting said rails in cantilever fashion, card retaining fingers mounted for rocking movement at the free end of said rails, means for rocking said card retaining fingers into and out of the plane of cards deposited on said rails, means for mounting said rack for rocking movement, a card feeding magazine, and means responsive to the rocking of said card retaining fingers for rocking said rack from a card loading position to a card discharging position in registration with said card feeding magazine.

5. In a high speed tabulating card feeding device, a card feeding magazine having therein a card feeding knife for feeding cards in seriatim from the bottom of a card stack in said magazine, means above and in alignment with said magazine for retaining a substantial number of cards, and means between said retaining means and said card magazine for intermittently feeding limited numbers of cards into said magazine from said retaining means.

6. In a high speed tabulating card feeding device, a card feeding magazine having therein a card feeding knife for feeding cards in seriatim from the bottom of a card stack in said magazine, means above and in alignment with said magazine for retaining a substantial number of cards, and means between said retaining means and said card magazine and responsive to the condition of the card supply in said magazine for intermittently feeding limited numbers of cards into said magazine from said retaining means.

7. In a high speed tabulating card feeding device, a card feeding magazine having therein a card feeding knife for feeding cards in seriatim from the bottom of a card stack in said magazine, means above and in alignment with said magazine for retaining a substantial number of cards, and a pair of retractable card support blades between said retaining means and said card magazine for supporting cards thereon and for intermittently feeding limited numbers of cards into said magazine from said retaining means.

8. In a high speed tabulating card feeding device, a card feeding magazine having therein a card feeding knife for feeding cards in seriatim from the bottom of a card stack in said magazine, means above and in alignment with said magazine for retaining a substantial number of cards, a pair of retractable card support blades between said retaining means and said card magazine for intermittently feeding limited numbers of cards into said magazine from said retaining means, and a resilient pressure member above said blades adapted to engage and hold a column of cards when said card support blades are in the retracted position.

9. In a high speed tabulating card feeding device, a card feeding magazine having therein a card feeding knife for feeding cards in seriatim from the bottom of a card stack in said magazine, means above and in alignment with said magazine for retaining a substantial number of cards, means between said retaining means and said card magazine for intermittently feeding limited numbers of cards into said magazine from said retaining means, an electromagnetic clutch for operating said feeding means, and means responsive to the condition of the card supply in said magazine for energizing said clutch.

10. In a high speed tabulating card feeding device, a card feeding magazine having therein a card feeding knife for feeding cards in seriatim from the bottom of a card stack in said magazine, means above and in alignment with said magazine for retaining a substantial number of cards, a pair of retractable card support blades between said retaining means and said card magazine for intermittently feeding limited numbers of cards into said magazine from said retaining means, a resilient pressure member above said blades adapted to engage and hold a column of cards when said card support blades are in the retracted position, and common operating means for actuating said blades and said pressure member in timed relation to each other.

11. In a tabulating card feeding device, a loading rack comprising a plurality of rails adapted to support a card file drawer by engagement with complementary surfaces thereof, a base plate supporting said rails in cantilever fashion, means for mounting said rack for rocking movement into and out of card discharging position, a card feeding magazine, a reversible motor for rocking said rack from a card loading position to a card discharging position in registration with said card feeding magazine, means for energizing said motor, means engageable by said rack in its position of registration with said card feeding magazine for deenergizing said motor and for reversing the input thereto, and means operable upon the complete discharge of cards from said rack into said card feeding magazine to energize said motor and thereby rock said rack out of card feeding position.

12. In a tabulating card feeding device, a loading rack comprising a plurality of rails adapted to support a card file drawer by engagement with complementary surfaces thereof, a base plate supporting said rails in cantilever fashion, card retaining fingers mounted for rocking movement at the free end of said rails, a reversible motor for rocking said fingers into and out of the plane of cards deposited on said rails, means engageable by a card file drawer on said rack for energizing said reversible motor whereby said fingers are rocked into the plane of cards deposited on said rails, means for mounting said rack for rocking movement, a card feeding magazine, and means for rocking said rack from a card loading position to a card discharging position in registration with said card feeding magazine.

13. In a tabulating card feeding device, a loading rack comprising a plurality of rails adapted to support a card file drawer by engagement with complementary surfaces thereof, a base plate supporting said rails in cantilever fashion, card retaining fingers mounted for rocking movement at the free end of said rails, a reversible motor for rocking said fingers into and out of the plane of cards deposited on said rails, means for mounting said rack for rocking movement, a card feeding magazine, a motor for rocking said rack from a card loading position to a card discharging position in registration with said card feeding magazine, and means engageable by said rack in its card discharging position for reversing said reversible motor to rock said fingers out of the plane of cards deposited on said rack whereby the cards on said rack are freed for discharge into said card feeding magazine.

14. In a tabulating card feeding device, a loading rack comprising a plurality of rails adapted to support a card file drawer by engagement with complementary surfaces thereof, a base plate supporting said rails in cantilever fashion, card retaining fingers mounted for rocking movement at the free end of said rails, a reversible motor for rocking said fingers into and out of the plane of cards deposited on said rails, means engageable by a card file drawer on said rack for energizing said reversible motor whereby said fingers are rocked into the plane of cards deposited on said rails, means for mounting said rack for rocking movement, a card feeding magazine, means for rocking said rack from a card loading position to a card discharging position in registration with said card feeding magazine, and means engageable by said rack in its card discharging position for reversing said reversible motor to rock said fingers out of the plane of cards deposited on said rails whereby the cards on said rails are freed for discharge into said card feeding magazine.

References Cited in the file of this patent

UNITED STATES PATENTS

| | | | |
|---|---|---|---|
| 748,125 | Weber | Dec. 29, | 1903 |
| 1,374,130 | Woodbury | Apr. 5, | 1921 |
| 1,603,294 | Reiser | Oct. 19, | 1926 |
| 1,781,007 | Gollnick | Nov. 11, | 1930 |
| 1,846,324 | Finn | Feb. 23, | 1932 |
| 2,063,486 | Carroll | Dec. 8, | 1936 |
| 2,394,604 | Ford | Feb. 12, | 1946 |
| 2,510,559 | Daly | June 6, | 1950 |
| 2,632,644 | Wockenfuss | Mar. 24, | 1953 |
| 2,726,860 | Luhn | Dec. 13, | 1955 |